(12) United States Patent
Michelutti et al.

(10) Patent No.: US 10,571,296 B2
(45) Date of Patent: *Feb. 25, 2020

(54) CIRCUIT, METHOD AND SENSOR FOR OBTAINING INFORMATION ON A PHYSICAL QUANTITY

(71) Applicant: Infineon Technologies AG, Nuebiberg (DE)

(72) Inventors: Alessandro Michelutti, Villach (AT); Bernhard Schaffer, Villach (AT); Wolfgang Horn, Klagenfurt (AT); Simon Hainz, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 147 days.

This patent is subject to a terminal disclaimer.

(21) Appl. No.: 15/290,355

(22) Filed: Oct. 11, 2016

(65) Prior Publication Data

US 2017/0122772 A1 May 4, 2017

Related U.S. Application Data

(62) Division of application No. 14/064,462, filed on Oct. 28, 2013, now Pat. No. 9,488,505.

(51) Int. Cl.
*G01D 11/00* (2006.01)
*G01D 3/028* (2006.01)
*G05F 3/26* (2006.01)

(52) U.S. Cl.
CPC ............ *G01D 3/028* (2013.01); *G01D 11/00* (2013.01); *G05F 3/262* (2013.01)

(58) Field of Classification Search
CPC .......... G01D 11/00; G01D 3/02; G01D 3/028; G01D 3/036; G01R 27/02; G01R 31/08;
(Continued)

(56) References Cited

U.S. PATENT DOCUMENTS 7,923,987 B2 4/2011 Ausserlechner
2005/0285601 A1* 12/2005 Seto ..................... G01R 17/105
324/526
(Continued)

FOREIGN PATENT DOCUMENTS

CN 1704742 A 12/2005
CN 101981461 A 2/2011
(Continued)

OTHER PUBLICATIONS

Search Report dated Jun. 27, 2016 for Chinese Patent Application No. 2014105848924.

*Primary Examiner* — Son T Le
(74) *Attorney, Agent, or Firm* — Schiff Hardin LLP

(57) ABSTRACT

A circuit for obtaining information on a physical quantity according to an embodiment includes a sensor arrangement sensitive to the physical quantity, at least one further sensor element sensitive to the physical quantity and a supply circuit configured to provide the sensor arrangement with a supply signal comprising a supply voltage controlled by the supply circuit in a closed-loop configuration. The supply circuit is further configured to provide the at least one further sensor element with a further supply signal comprising a further supply current such that a magnitude of the further supply current fulfills a predetermined relationship with a magnitude of a supply current of the supply signal. As a consequence, it may be possible to improve a trade-off between an improved compensation of variations, simplifying an implementation, simplifying the manufacturing, simplifying the sensing and providing stable sensing conditions.

14 Claims, 16 Drawing Sheets

(58) Field of Classification Search
CPC .. G01R 17/12; G01L 1/22; G01L 3/10; G01L 7/00; G01M 3/3236; G05F 1/10; G05F 3/26; G05F 3/262; G05F 1/575
See application file for complete search history.

(56) References Cited

U.S. PATENT DOCUMENTS

| | | | |
|---|---|---|---|
| 2007/0295095 A1* | 12/2007 | Kurtz | G01M 3/3236 73/714 |
| 2008/0297955 A1 | 12/2008 | Ausserlechner | |
| 2013/0033247 A1* | 2/2013 | Endo | G05F 1/575 323/282 |
| 2013/0229175 A1 | 9/2013 | Wang et al. | |

FOREIGN PATENT DOCUMENTS

| | | |
|---|---|---|
| CN | 103328932 A | 9/2013 |
| DE | 10131229 A1 | 4/2002 |
| DE | 102005029464 A1 | 12/2006 |
| DE | 102008051949 A1 | 5/2009 |
| EP | 0665437 A1 | 8/1995 |

\* cited by examiner

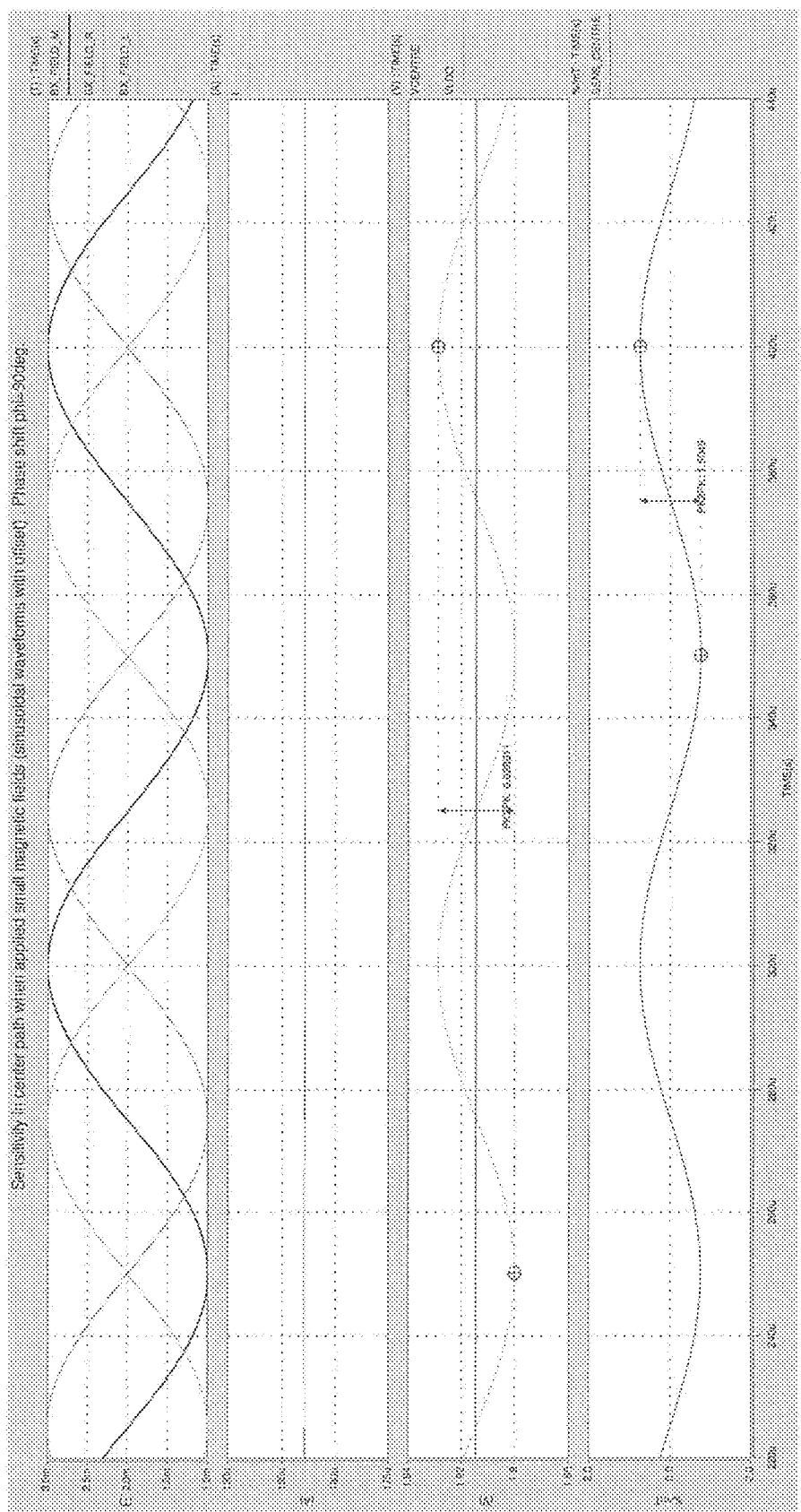

CIRCUIT, METHOD AND SENSOR FOR OBTAINING INFORMATION ON A PHYSICAL QUANTITY

FIELD

Embodiments relate to a circuit, a method and a sensor for obtaining information on a physical quantity.

BACKGROUND

Many applications rely on sensing a physical quantity such as a magnetic quantity, a temperature, a pressure, a physical quantity related to electromagnetic radiation or a mechanical exposure, to name just a few. The applications come from all fields of technology. For instance, some applications come from measuring a rotation speed and a rotation direction of a wheel of a motorized vehicle, a steering angle, or the like. These measurements may, for instance, be carried out using magnetic field sensor elements, optical sensor elements or other sensor elements, such as sensor elements sensitive to a mechanical stress.

Due to the widespread application of these sensors, expectations exist to simplify their manufacturing and implementation to reduce, for instance, costs associated with these devices. However, in many applications also reliability as well as accuracy are of at least some importance. Sources for inaccuracies come, for instance, from deviations from stable sensing conditions as well as variations such as temperature-related or process-related variations to name just two examples.

Therefore, a demand exists to improve a trade-off between an improved compensation of variations, simplifying an implementation, simplifying the manufacturing, simplifying the sensing and providing stable sensing conditions.

SUMMARY

A circuit for obtaining information on a physical quantity according to an embodiment comprises a sensor arrangement sensitive to a physical quantity and at least one further sensor element sensitive to the physical quantity. The circuit according to an embodiment further comprises a supply circuit configured to provide the sensor arrangement with a supply signal comprising a supply voltage controlled by the supply circuit in a closed-loop configuration. The supply circuit is further configured to provide the at least one further sensor element with a further supply signal comprising a further supply current such that a magnitude of the further supply current fulfills a predetermined relationship with a magnitude of a supply current of the supply signal.

A method for obtaining information on a physical quantity comprises providing a sensor arrangement with a supply signal comprising a supply voltage controlled by the supply circuit in a closed-loop configuration, wherein the sensor arrangement is sensitive to a physical quantity. It further comprises providing at least one further sensor element with a further supply signal comprising a further supply current such that a magnitude of the further supply current fulfills a predetermined relationship with a magnitude of a supply current of the supply signal, wherein the at least one further signal element is sensitive to the physical quantity.

BRIEF DESCRIPTION OF THE DRAWINGS

Several embodiments of the present invention will be described in the enclosed Figures.

FIGS. 16A to 16D show diagrams of small magnetic signal responses in a sensor according to an embodiment for small magnetic fields with a phase shift of 90°.

DETAILED DESCRIPTION

In the following, embodiments according to the present invention will be described in more detail. In this context, summarizing reference signs will be used to describe several objects simultaneously or to describe common features, dimensions, characteristics, or the like of these objects. The summarizing reference signs are based on their individual reference signs. Moreover, objects appearing in several embodiments or several figures, but which are identical or at least similar in terms of at least some of their functions or structural features, will be denoted with the same or similar reference signs. To avoid unnecessary repetitions, parts of the description referring to such objects also relate to the corresponding objects of the different embodiments or the different figures, unless explicitly or—taking the context of the description and the figures into account—implicitly stated otherwise. Therefore, similar or related objects may be implemented with at least some identical or similar features, dimensions, and characteristics, but may be also implemented with differing properties.

In today's world, sensors for physical quantities are widely used in different fields of applications. The sensors involved are used to detect different physical quantities such as magnetic field-related or electromagnetic-related physical quantities as well as temperatures, pressures, mechanical stresses and the like. Depending on the application, different requirements, specification and boundary conditions are set. Among these, accuracy, reliability and availability often interact with each other leading to at least sometimes contradictory design goals. For instance, availability and, therefore, a widespread implementation of such sensor may make an easy manufacturing and implementation of the sensors attractive. However, just following these design goals, may unfavorably lead to less reliable and/or less accurate sensors.

For instance, to improve an accuracy of such a sensor, it may be interesting to implement an improved compensation of variations, such as temperature variations or process variations. Moreover, it may be desirable to enable sensors to operate under more stable sensing conditions and to simplify the sensing process.

Therefore, a demand exists to improve a trade-off between a compensation of variations concerning a sensor, simplifying its manufacturing process and implementation, providing stable sensing conditions and simplifying the sensing process. As will be outlined below in more detail, embodiments may provide the opportunity of improving the aforementioned trade-off.

Figure 1:
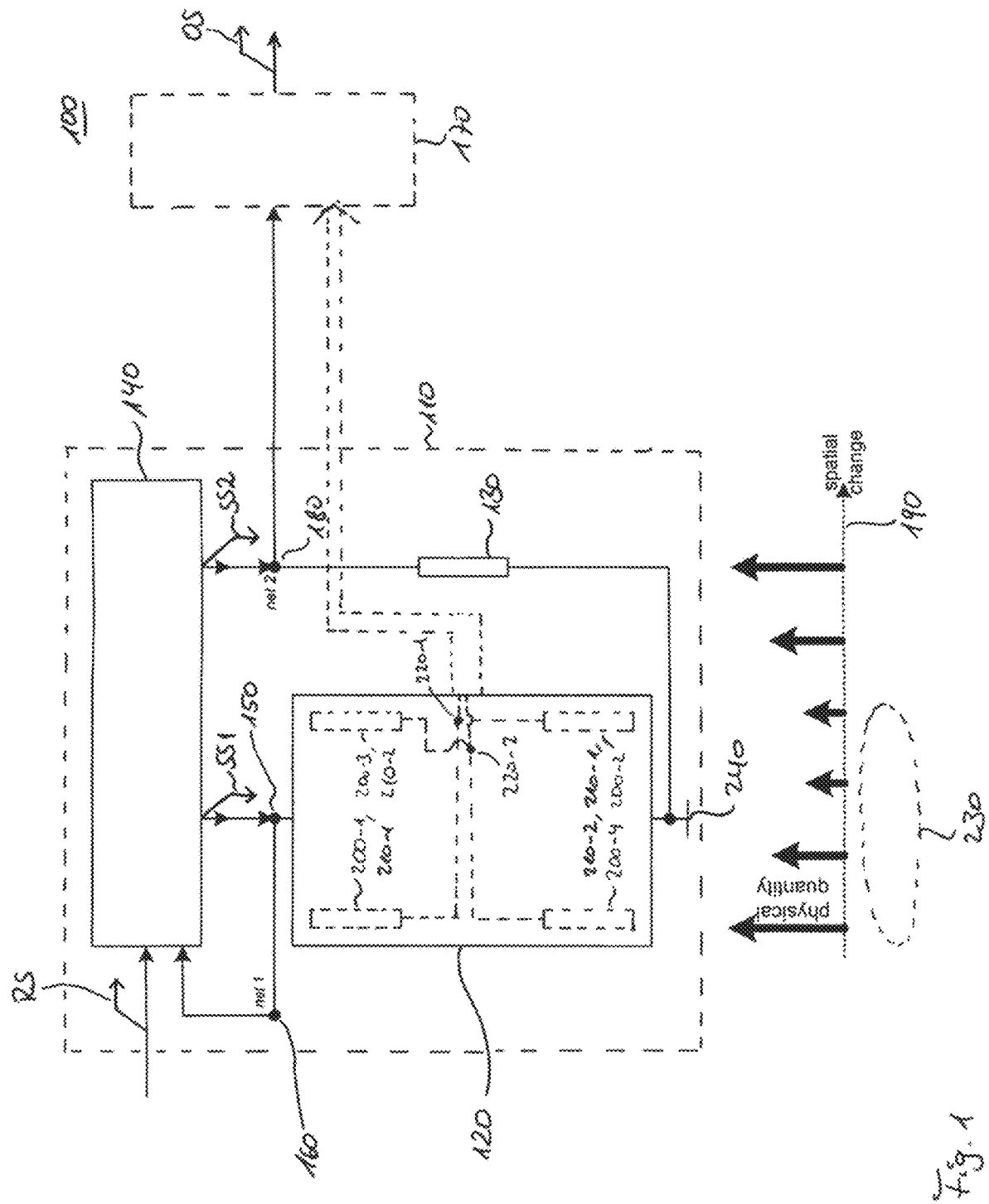
FIG. 1 shows a schematic block diagram of a sensor and a circuit according to an embodiment.

FIG. 1 shows a simplified block diagram of a sensor 100 according to an embodiment. Such an embodiments may improve the previously mentioned trade-off between an improved compensation of variations, simplifying an implementation, a manufacturing and sensing capabilities as well as providing more stable sensing conditions may be achieved by using a supply circuit, which provides the at least one further sensor element with a further supply signal comprising a further supply current, the magnitude of which fulfills a predetermined relationship with the magnitude of the supply current of the supply signal provided to the sensor arrangement. The sensor arrangement itself is operated in a closed-loop configuration. As a consequence, it may be possible to improve the compensation capabilities without introducing complex, in terms of sensing more unstable or more variation-prone components, since the at least one further sensor element is supplied with the further supply signal, which includes at least some compensations of variations due to the closed-loop configuration of the supply signal provided to the sensor arrangement.

The sensor 100 comprises a circuit 110 for obtaining information on a physical quantity. The physical quantity may, for instance, be a strength of a magnetic field, a direction of a magnetic field, a strength of a component of a magnetic field, a temperature, a pressure, an intensity of an electromagnetic radiation, a frequency of an electromagnetic radiation, a wavelength of the electromagnetic radiation and a mechanical exposure or stress.

The circuit 110 comprises a sensor arrangement 120, which is sensitive to the physical quantity as well as at least one further sensor element 130, which is also sensitive to the physical quantity. The embodiment shown in FIG. 1 comprises exactly one further sensor element 130, but other embodiments may comprise more. The at least one further sensor element 130 may be used to obtain additional information about the physical quantity, such as direction in the case of a moving inhomogeneous dependency of the physical quantity.

The circuit 110 further comprises a supply circuit 140, which is configured to provide the sensor arrangement 120 with a supply signal SS1 comprising a supply voltage controlled by the supply circuit 140 in a closed-loop configuration. In the embodiment shown in FIG. 1, the supply circuit 140 is coupled via a first node 150 to the sensor arrangement 120. The first node 150 is used to couple a feedback circuit 160, which is also referred to as net1. The supply circuit 140 provides the supply signal SS1 having a supply current in such a way that the supply voltage of the supply signal SS1 is regulated or controlled. The supply current is the quantity, which is used to regulate or control the voltage at the node net1 of the feedback circuit 160.

However, before describing possible implementations of the closed-feedback loop in more detail, the circuit 110 will be described first. The supply circuit 140 is further configured to provide the at least one further sensor element 130 with a further supply signal SS2 comprising a further supply current such that a magnitude of the further supply current fulfills a predetermined relationship with a magnitude of the supply current of the supply signal SS1. By using a supply circuit 140 as outlined, it may be possible to improve the aforementioned trade-off by provided the further sensor element 130 with a supply current depending on the operational conditions of the sensor arrangement 120. In other words, the further supply signal SS2 is provided to the further sensor element 130 taking influences on the sensor element 120 at least partially into account. For instance, an influence on the sensor 100 and its sensor elements caused by temperature variations, process variations or other variations may therefore be at least partially compensated.

To put it in different terms, the further supply signal SS2 comprises a not-regulated voltage or in yet other words, a voltage created in an open loop. It is not to be intended to be kept at a constant value.

The further supply signal SS2 may optionally be provided such that the magnitude of the further supply current is essentially proportional to the magnitude of the supply current of the supply signal SS1. The further supply current may be, for instance, a proportional copy of the supply current provided to the sensor arrangement 120. As a consequence, it may be possible to implement the supply circuit 140 in a simple and efficient way.

For instance, as will be outlined in more detail below, the supply circuit may optionally comprise a current mirror configured to provide the further supply signal with the magnitude of the further current based on the magnitude of a supply current of a supply signal.

The supply signal SS1 and the further supply signal SS2 may both comprise alternating and/or direct contributions. For instance, both supply signals SS1, SS2 may comprise AC- (alternating current) and/or DC-components (direct current).

Returning to the closed-loop configuration for providing the supply signal SS1, the supply circuit 140 may be optionally configured to keep the magnitude of the supply voltage of the supply signal SS1 essentially constant. In the embodiment shown in FIG. 1, the supply circuit 140 is provided with a reference signal RS indicative of the supply voltage of the supply signal SS1. The supply circuit 140 may then, as shown in FIG. 1, be configured to provide the supply signal SS1 such that the voltage fed back via the first node 150 is essentially constant and, optionally, identical to that of the reference signal RS. The closed-loop configuration of the supply circuit 140 may, hence, regulate the two voltages supplied to the supply circuit 140 to be identical. The reference signal RS represents in this case an electric target for the regulation of the first node 150 and the feedback circuit 160 coupled thereto. As a consequence, the supply voltage is independent from the physical quantity, which is to be sensed by the further sensor element 130 and the sensor arrangement 120.

The sensor 100 or the circuit 110 may optionally comprise a detection circuit 170 coupled to the at least one sensor element 130 and configured to generate an output signal OS indicative of the additional information on the physical quantity to be determined. In the embodiment shown in FIG. 1, the detection circuit 170 is coupled to a second node 180, which is also referred to as net2 in FIG. 1. The second node 180 is arranged in between the supply circuit 140 and the further sensor element 130. This allows the detection circuit 170 to detect the voltage supplied to the at least one further sensor element 130.

As mentioned before, the embodiment shown in FIG. 1 comprises just a single further sensor element 130. However, in other embodiments of a sensor 100 or a circuit 110, more than one further sensor elements 130 may be employed. Hence, a plurality of further sensor elements 130 may be used and, for instance, coupled to the detection circuit 170.

Returning to the sensor arrangement 120, it is to be noted that the sensor arrangement 120 may be configured to generate a signal, which is indicative of a spatial change of the physical quantity with respect to a direction 190. To illustrate this, in the lower part of FIG. 1 the physical quantity is illustrated along the direction 190 as arrows pointing upwards, the length of which is indicative of the respective physical quantity.

The sensor arrangement 120 may optionally comprise a single sensor element 200 capable of detecting such a spatial change of the physical quantity as illustrated in FIG. 1. However, in other embodiments, the sensor arrangement 120 may comprise a plurality of sensor elements 200, which are sensitive to the physical quantity and arranged such that the sensor elements 200 are capable of generating the signal indicative of the spatial change as outlined before.

To be more precise, in the embodiment shown in FIG. 1, the sensor arrangement 120 comprises four sensor elements 200-1, . . . , 200-4, which are at least partially spatially shifted along the direction 190. Due to their spatial arrangement along the direction 190, it is possible to couple the sensor elements 200 such that the sensor element arrangement 120 is capable of generating the previously-described signal indicative of the spatial change of the physical quantity along the direction 190, allowing a differential measurement of the physical quantity.

Here, the sensor elements 200 are arranged to form half bridges 210-1, 210-2. The two half bridges 210 each comprise at least two sensor elements 200-1, 200-2 and 200-3, 200-4, respectively, as well as a node 220-1, 220-2, respectively, coupled between the at least two sensor elements 200. The signal indicative of the spatial change of the physical quantity is obtainable at the nodes 220 of the half bridges 210.

The two half bridges of the circuit 110 and the sensor 100 shown in FIG. 1 may operate independently of one another. Embodiments may, hence, be implemented with just one or more independently used half bridges 210. However, in the embodiment shown in FIG. 1, the sensor element arrangement 120 comprises two half bridges 210 coupled in parallel to form a full bridge. As a consequence, the full bridge is capable of providing the signal indicative of the spatial change obtainable at the nodes 220-1, 220-2 of the two half bridges 210-1, 210-2, respectively. Naturally, it is also possible to implement more than two half bridges to form a full bridge.

Due to the arrangement of the sensor elements 200, along the direction 190, the signals obtainable at the nodes 220 of the respective half bridges 210 may be considered to be indicative of a difference of the physical quantities $B_R$ and $B_L$ and, hence, indicative of the differential quantity $B_R$-$B_L$. In other words, at the node 220 a differential signal depending on $B_R$-$B_L$ shows up. It is to be noted that the rightmost arrow shown in the lower part of FIG. 1 represents the physical quantity acting on the further sensor element 130.

As a consequence, the current SS1 provided by the supply circuit 140 may be dependent on the physical quantity sensed by the sensor elements 200-1, . . . , 200-4. Hence, information on an average value 230 of the physical quantity acting on these sensor elements 200 of the sensor arrangement 120 may be comprised in the current SS1. Depending on the physical quantity to be sensed, the sensor elements 200 as well as the further sensor elements 130 may be any sensor element capable of detecting the respective physical quantity. For instance, the sensor elements 200 as well as the further sensor element 130 may be a magnetic field sensor element, a temperature sensor element, a pressure sensor element, a light-detecting sensor element or a sensor element being sensitive to mechanical exposure or stress.

To name just a few examples, a magnetic field-sensitive sensor element may, for instance, comprise an anisotropic magneto-resistive sensor element (AMR), a giant magneto-resistive sensor element (GMR), a tunneling magneto-resistive sensor element (TMR), a colossal magneto-resistive sensor element (CMR), an extraordinary magneto-resistive sensor element (EMR), a lateral Hall sensor element or a vertical Hall sensor element. Naturally, it may also be a pressure sensor, a temperature sensor, or the like, when other physical quantities are to be detected. Naturally, the physical quantity to be detected may be affected by another physical quantity allowing an indirect measurement of the physical quantity. For instance, although the sensor elements 200, 130 used are sensitive to a specific physical influence and, hence, physical quantity, the physical quantity to be sensed or measured may only indirectly influence the sensor elements 130, 200 to cause the physical influence detectable by the respective sensor elements 130, 200.

Both, the sensor arrangement 120 and the at least one further sensor element 130 is furthermore coupled to a terminal 240 for a reference potential, such as ground. It should be noted that the at least one further sensor element 130 is only provided with the further supply signal SS2. In other words, the further sensor elements 130 are not biased with additional components in the embodiment shown in FIG. 1.

The sensor element arrangement 120 may comprise resistive sensor elements 200, which change their current consumption due to the average value 230 of the physical quantity acting on the respective sensor elements 200. Naturally, the same may also apply to the further sensor element 130 or the further sensor elements 130 to which the further supply signal SS2 is supplied.

When the average value 230 of the physical quantity acting on the sensor elements 200 of the sensor arrangement 120 is changed, due to the closed-loop configuration providing the essentially constant supply voltage of the supply signal SS1 the supply current of the supply signal SS1 is changed accordingly to keep the supply voltage of the supply signal SS1 essentially constant.

Since the further supply current of the further supply signal SS2 and the supply current of the supply signal SS1 fulfill the predetermined relationship, the change of the physical quantity leading to the change of the average value 230 will be at least partially transferred to the further supply signal SS2 of the further sensor element 130, for instance, by providing a proportional copy of the supply current. As a consequence, the detection circuit 170 may, for instance, be capable of detecting at the second node 130 a voltage indicative of a difference of the average value 230 of the physical quantity and the physical quantity acting on the further sensor element 130.

Optionally, the detection circuit 170 may also be coupled to the sensor arrangement 120, for instance, to the nodes 220-1, 220-2 of the half bridges 210-1, 210-2, respectively, to enable the detection circuit 170 to detect and optionally to process the signals provided by the half bridges 210. In this case, the output signal OS may further be indicative of the average value 230 acting on the sensor elements 200 of the sensor arrangement 120, a gradient or another spatial dependency or change of the physical quantity along direction 190.

Figure 2:
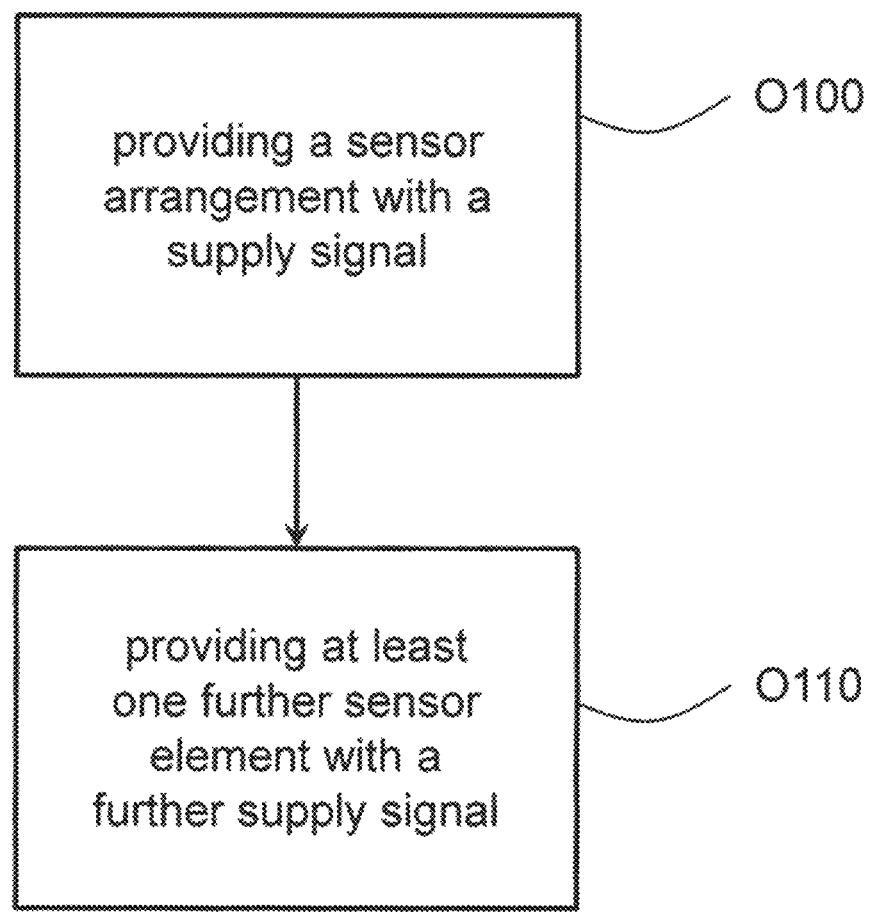
FIG. 2 shows a flow chart of a method for obtaining information on a physical quantity according to an embodiment.

FIG. 2 shows a flowchart of a method for obtaining information on a physical quantity according to an embodiment. In a first operation, O110, the sensor arrangement 120 is provided with the supply signal SS1 comprising a supply voltage controlled by the supply circuit 140 in a closed-loop configuration. The sensor arrangement 120 is sensitive to the physical quantity. In an operation O110 at least one further sensor element 130 is provided with the further supply signal SS2 comprising the further supply current such that a magnitude of a further supply current fulfills the previously-described predetermined relationship with the magnitude of the supply current of the supply signal SS1, wherein the at least one further sensor element 130 is also sensitive to the physical quantity.

However, it is to be noted that the operations described are by far not required to be carried out in the described order. The order of the operations may, for instance, be changed, at least partially timely overlapping or carried out simultaneously. The operations may also be processed repeatedly as a whole or at least partially.

As outlined before, sensors are used in a large variety of technical applications. In some of the applications, not only detecting the actual physical quantity or a spatial change along the direction 190 is of interest, but also a detection of a speed or a movement of the physical quantity in relation to the sensor or its sensor elements. Examples come, for instance, from the fields of detecting a rotation of a wheel such as a wheel of a car or another motorized vehicle, detecting a steering angle, a change thereof or similar applications.

An important challenge to be solved in this context is the detection of the speed and direction of a movement of a typically inhomogeneous physical quantity relative to the sensor. The sensor elements of the sensor are typically sensitive to the respective physical quantity and may, for instance, deliver a single-ended output signal proportional to the physical quantity or having another functional dependency with respect to the physical quantity. In contrast to a differential output signal, the sensor elements often merely provide a signal indicative of the physical quantity rather than a difference, a gradient or the like of the physical quantity.

To detect speed and direction of a movement, an arrangement of more than a single sensor element is, therefore, often used. Examples or applications come, but are by far not limited to the detection of rotation of a magnetic pole wheel or tooth wheel, a detection of a heat wave or the detection of a pressure wave to name just a few.

In the case of a detection of a rotation of a magnetic pole wheel or tooth wheel, the sensor elements may, for instance, be giant magneto-resistive sensor elements (GMR) and the associated physical quantity a moving or modulated magnetic field in terms of strength and/or direction. In the case of a detection of a heat wave, the sensor elements may be temperature-dependent resistors and the temperature the physical quantity to be sensed. Accordingly, in the case of detection of a pressure wave, the sensor elements may be pressure-dependent capacitances with the physical quantity being the pressure.

Figure 3:
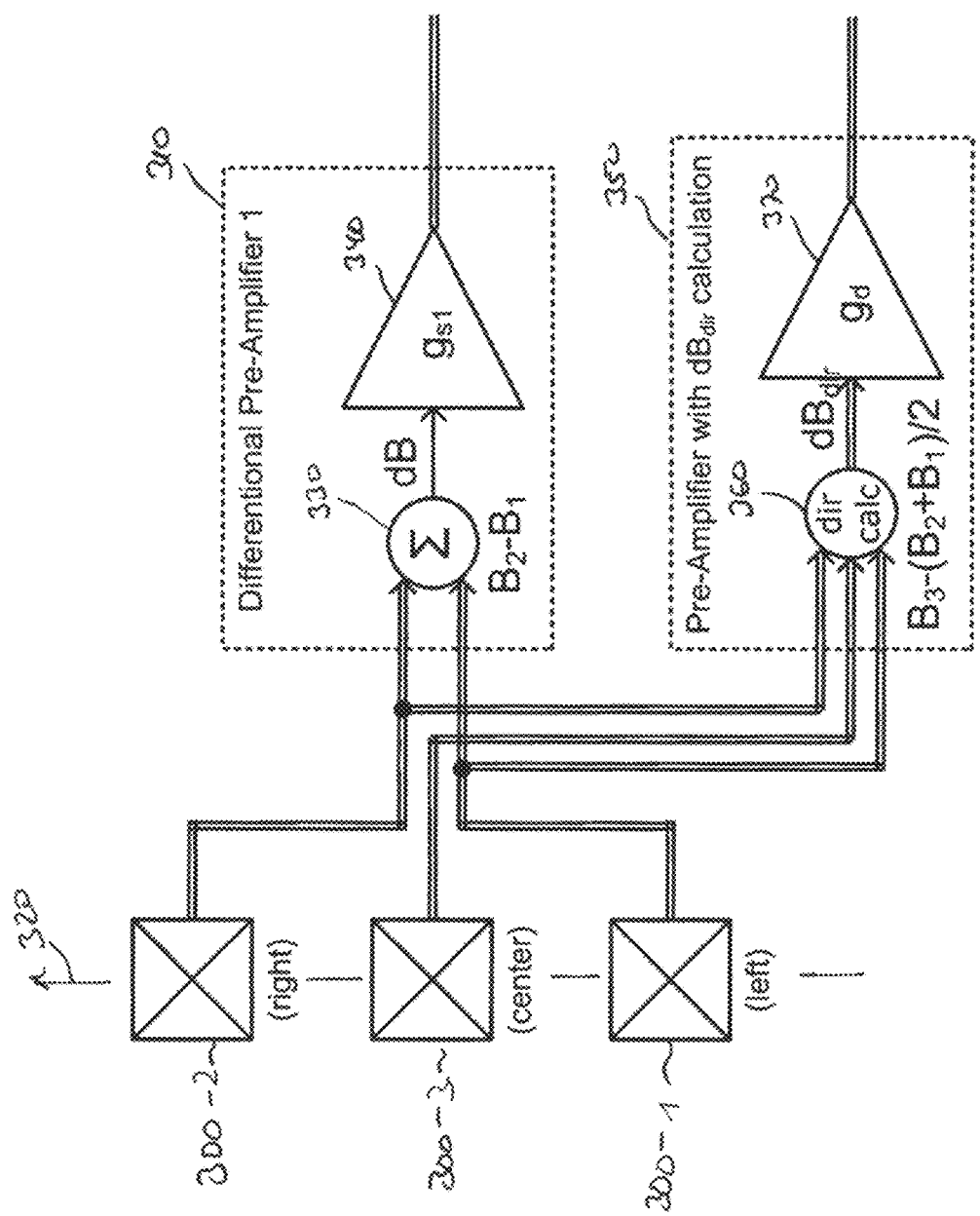
FIG. 3 shows a schematic block diagram of a sensor using Hall sensor elements.

Solutions exist for sensor elements delivering a differential output, such as Hall elements. FIG. 3 shows a simplified block diagram of such a solution. The circuit shown in FIG. 3 comprises three Hall elements 300-1, 300-2, 300-3, providing signals $B_1$, $B_2$ and $B_3$, which are oriented along a direction 320 such that the Hall element 300-2 is the right Hall element, Hall element 300-3 is a center Hall element and Hall element 300-1 is the left Hall element.

The first and second Hall elements 300-1, 300-2 are coupled to a differential amplifier 310, which comprises a summing block 330, which subtracts the signal $B_1$ from Hall element 300-1 from the signal $B_2$ of Hall element 300-2 to obtain a differential signal $dB=B_2-B_1$, which is then amplified by an amplifier 340 by a factor $g_{S1}$.

The circuit further comprises a further pre-amplifier 350 with a differential direction calculation comprising a further summing block 360 to which all three Hall elements 300-1, 300-2, 300-3 are coupled. The further summing block 360 calculates a difference of the signal $B_3$ provided by Hall element 300-3 and an arithmetic mean value of the signals $B_2$ of Hall element 300-2 and $B_1$ of Hall element 300-1 to obtain a direction signal $d_{Bdir}=B_3-(B_2+B_1)/2$. The further preamplifier 350 further comprises a further amplifier 370, which amplifies the signal $d_{Bdir}$ by a factor $g_d$.

In the example shown in FIG. 3, hence, two different signal paths are generated, one in phase with a difference of a right physical quantity ($B_R$) and the left physical quantity ($B_L$; right-left physical quantity $B_R-B_L$) and one with a center one. For single-ended sensor elements, like GMR sensor elements, a Wheatstone bridge configuration can be used to obtain a differential signal. A possible implementation is shown in FIG. 4.

Conventionally, concentrated sensor elements (mono cells) may also be used. However, mono cells may not be able to suppress homogeneous changes in the physical quantity as opposed to differential ones. For instance, a dynamic homogeneous magnetic disturbance-field may eventually not be distinguished from a differential field caused by a moving pole wheel or another wanted magnetic field source. This may lead to a greatly degraded robustness of the sensor in the presence of external disturbances.

Figure 4:
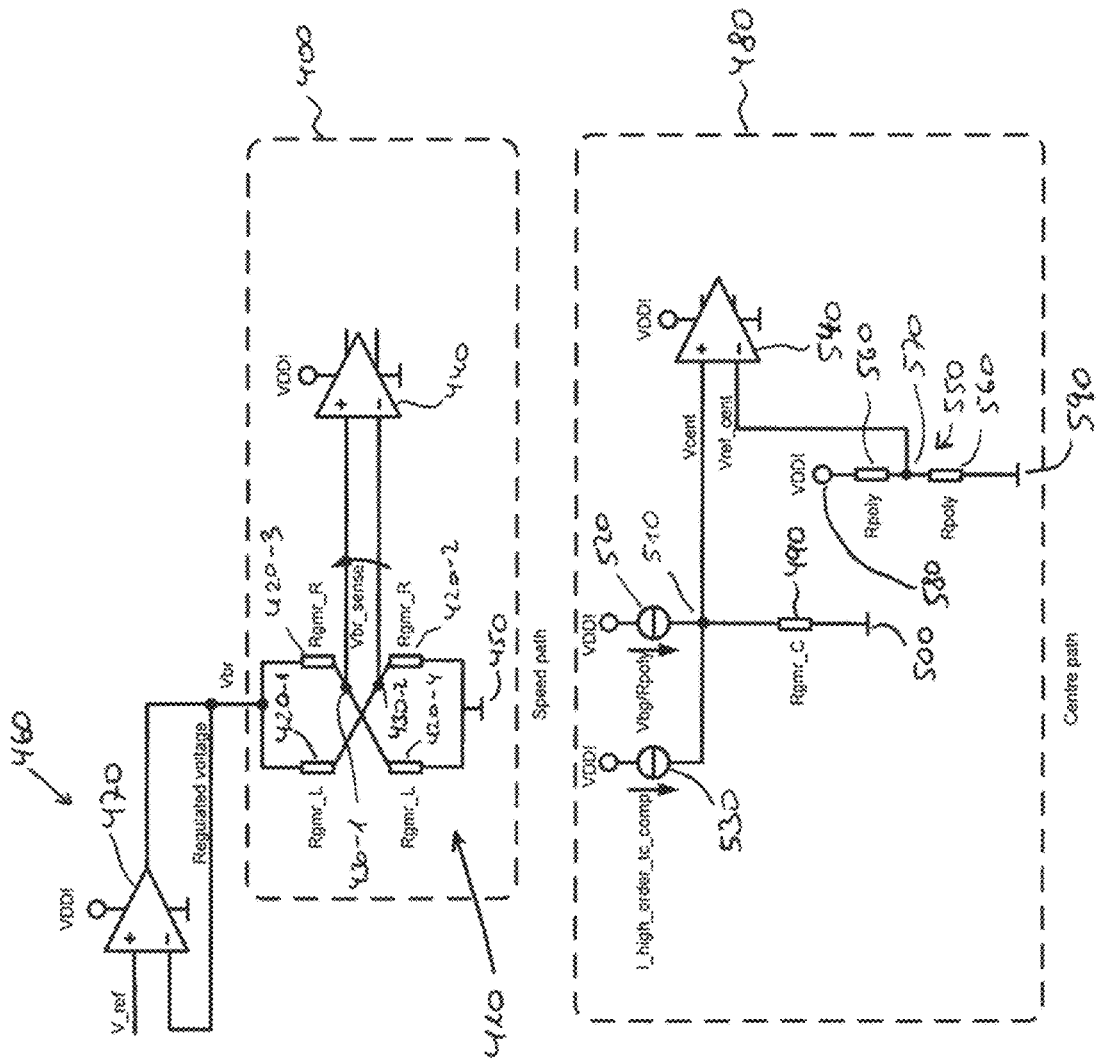
FIG. 4 shows a simplified block diagram of another sensor using GMR sensor elements.

The circuit shown in FIG. 4 comprises in a speed path 400 a Wheatstone bridge configuration 410 comprising two parallel half bridges comprising each two GMR sensor elements 420-1, 420-2 and 420-3, 420-4, respectively, coupled in series with one another. Between each of the two series connections of the respective GMR sensor elements 420, a node 430-1, 430-2 is coupled at which a sense voltage Vbr_sense is obtainable, which is coupled to a differential amplifier 440. At the output of the differential amplifier 440, an output signal is obtainable indicative of the spatial variation of a magnetic field applied to the GMR sensor elements 420. This signal may, for instance, be indicative of a speed of a change of the magnetic field source creating the magnetic field to which the GMR sensor elements 420 are subjected.

The Wheatstone bridge 410, which is a full bridge, is coupled in between a terminal for a reference potential 450 and a power supply circuit 460 comprising an operational amplifier 470, which is supplied with a reference potential V_ref provided to the non-inverting input of the operation amplifier 470 and a fed back voltage provided to the inverting input of the operational amplifier 470, which is provided at the output of the operational amplifier 470. As a consequence, a regulated voltage Vbr (bridge voltage) is supplied to the Wheatstone bridge 410.

However, the circuit as shown in FIG. 4 further comprises a center path 480 which runs completely independently of the speed path 400 and its power supply circuit 460. The center path 480 comprises a center GMR sensor element 490 (Rgmr_C). For the center element 490 a non-sensitive reference is used to obtain a pseudo-differential signal.

To be more precise, the center GMR sensor element 490 is coupled in between a terminal 500 for the reference potential 500 and a node 510 to which a fixed current source 520 and a further current source 530 are coupled. While the fixed current source 520 provides the basic current to operate the center GMR sensor element 490, the further current source 530 can provide an additional current to compensate for higher order temperature variations.

The node 510 is further coupled to a non-inverting input of a differential amplifier 540 at which the voltage Vcent dropping across the center GMR sensor element 490 is obtainable and provided to the differential amplifier 540. For the center GMR sensor element 490, a non-sensitive reference can be used to obtain a pseudo-differential signal as shown in FIG. 4. The center path 480 further comprises a voltage divider 550 comprising two poly-silicon (poly-Si) resistors 560 and a node 570 coupled in between the two poly-silicon resistors 560, which is coupled to an inverting input of the differential amplifier 540. The voltage divider 550 is coupled in between a terminal 580 for an external power supply VDD and a terminal 590 for a reference potential.

At an output of the differential amplifier 540, a signal is obtainable indicative of a magnetic field present at the center GMR sensor element 490 with respect to the fixed voltage present at the node 570 of the voltage divider 550. As a consequence, at the output of the differential amplifier 540, a pseudo-differential signal may be obtainable.

For the sake of completeness, it should be noted that the center GMR sensor element 490 may be arranged along a direction between the so-called left GMR sensor elements comprising the GMR sensor elements 420-1, 420-4 of the Wheatstone bridge 410 and the so-called right sensor elements comprising the GMR sensor elements 420-3 and 420-2 of the Wheatstone bridge 410.

The solution shown in FIG. 4 may suffer from the fact that it may be difficult to obtain a reference which correlates to the temperature and/or process-dependent variations of the GMR sensor elements 420, 490. Any mismatch might be detected as a signal. Complex higher-order trimming schemes may be used to mitigate this issue. A solution to overcome this problem may be the use of a multiple bridge configuration and to avoid utilization of a single sensor GMR sensor element. An example is depicted in FIG. 5.

Figure 5:
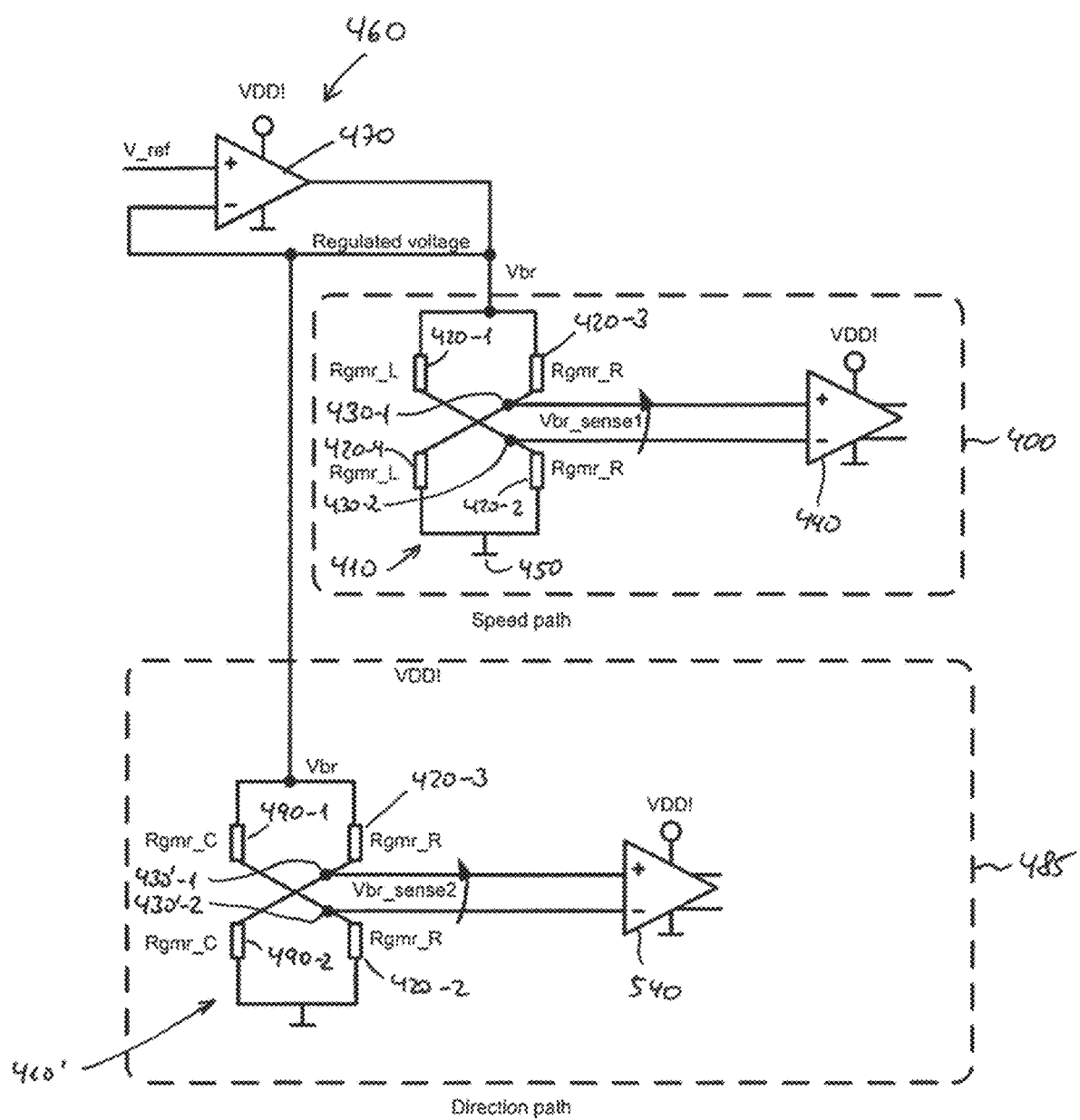
FIG. 5 shows a block diagram of a further sensor using GMR sensor elements.

FIG. 5 shows a circuit which resembles that of FIG. 4 to a very high extent. It also comprises a speed path 400, which is identical to the speed path 400 of the circuit shown in FIG. 4. Also, the power supply circuit 460 is identical and coupled identically to the speed path 400.

Only with respect to the center path 480 and its power supply, the circuit shown in FIG. 5 differs from that of FIG. 4. To be more precise, instead of a single center GMR sensor element 490, the circuit shown in FIG. 5 comprises a further or direction path 485 comprising a Wheatstone bridge 410', which in turn comprises two half bridges. The first half bridge comprises a first center GMR sensor element 490-1 and the GMR sensor element 420-2 or a GMR sensor element positioned nearby the GMR sensor element 420-2 of the Wheatstone bridge 410. Similarly, the second half bridge of the Wheatstone bridge 410' comprises a series connection of the GMR sensor element 420-3 or a GMR sensor element located nearby and a second center GMR sensor element 490-2. Between the respective GMR sensor elements 490-1, 420-2 and 420-3, 490-2 nodes 430'-1, 420'-2, respectively, are included, which are coupled to the non-inverting and inverting inputs of the differential amplifier 540, respectively. As a consequence, the differential amplifier 540 of the center path 480 is in the circuitry shown in FIG. 5 supplied with a second sensed voltage Vvr_sense2.

The Wheatstone bridge 410' of the center path 480 is also coupled to the output of the operational amplifier 470 is also supplied to the Wheatstone bridge 410' of the center path 480. Therefore, the two Wheatstone bridges 410, 410' of the speed path 400 and the center path 480, respectively, operate at the same regulated bridge voltage Vbr.

A less attractive point of this solution shown in FIG. 5 is the usage of many GMR sensor elements 420, 490 coupled into a full bridge for the direction path. Moreover, by using the GMR sensor elements 420-3, 420-2 for both Wheatstone bridges 410 or at least similarly positioned GMR sensor elements 420, a non-constant phase shift may be present between the speed path 400 and the direction path 485, which may be sensor-pitch dependent. Moreover, the direction path 485 may be less sensitive, unless a pair of center GMR sensor elements 490 and a second pair of right probes 420-2, 420-3 are used. These additional center GMR sensor elements may be spaced from the first pair as much as the right and left GMR sensor elements' distance to one another is. This, however, may lead to a larger chip or at least to a larger chip width.

A circuit 110 and a sensor 100 according to an embodiment may overcome these drawbacks by generating a reference for the at least one single-ended further sensor element 130 which may also be referred to as the center elements, wherein the reference correlates to the other sensor elements 200 temperature and process drifts. The reference signal (further supply signal SS2) may make a circuit 110 and a sensor 100 according to an embodiment inherently more robust to manufacturing tolerances. Furthermore, it may also suppress the homogeneous presence of a physical quantity like in a differential configuration without the need for an additional Wheatstone bridge. Furthermore, as described below, it may be possible to provide a more favorable phase relation between a speed and a direction signal independent of the sensor element pitch, which may enable a more simple and reliable signal processing algorithm. The direction signals may be obtained from the central path.

For the sake of simplicity only, in the following an embodiment of a GMR-based magnetic sensor for detection of rotational speed and direction of a magnetic pole wheel will be described in more detail. However, it should be noted that this embodiment merely represents an example and can easily be extended to other applications and a more general purpose of embodiments as described above.

Figure 6:
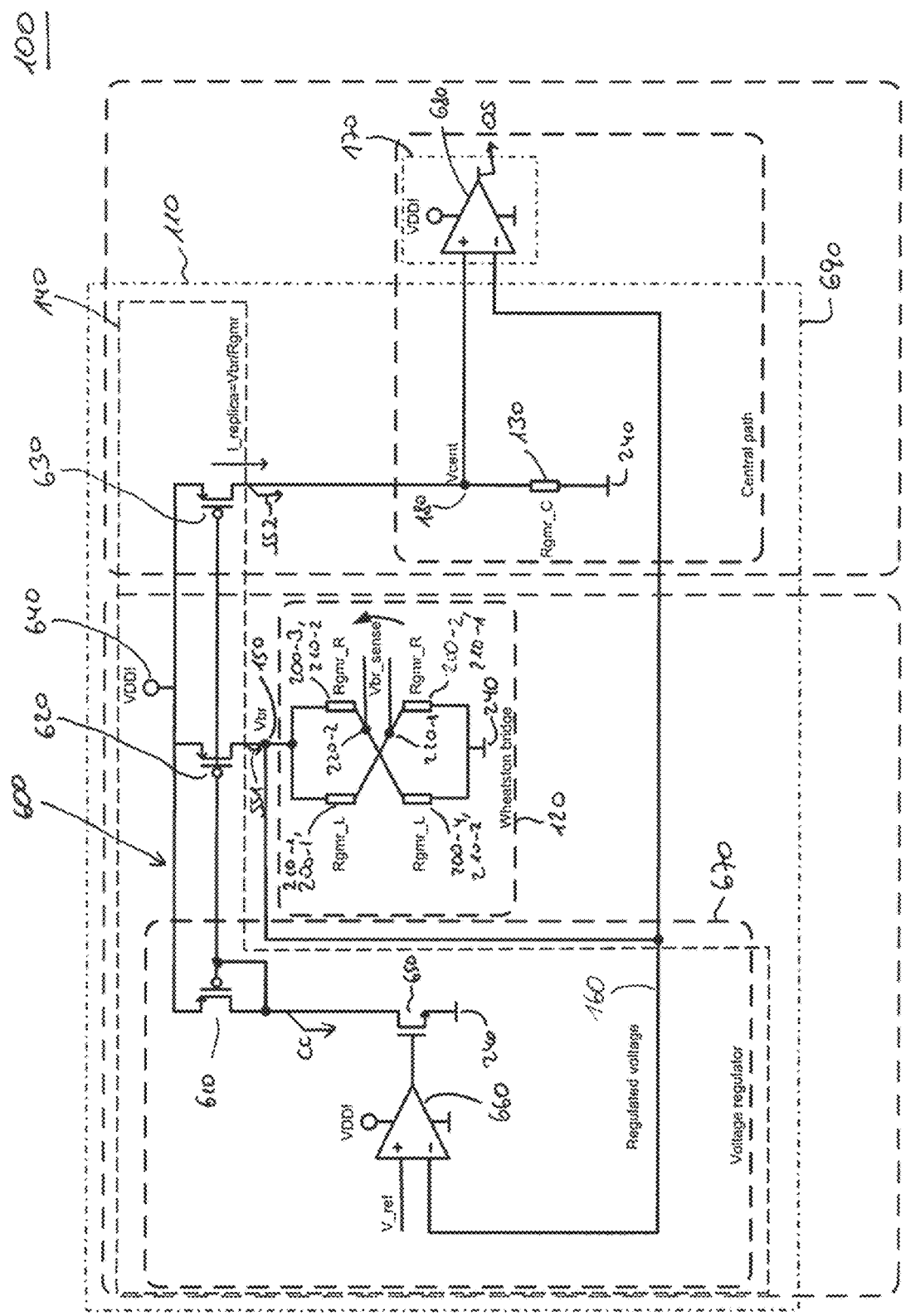
FIG. 6 shows a block diagram of a sensor and circuit according to an embodiment.

FIG. 6 shows a circuit diagram of a GMR-based sensor 100 according to an embodiment. The sensor 100 comprises once again a circuit 110 for obtaining information on a physical quantity, which in the present case is a magnetic field-related physical quantity. It further comprises a sensor arrangement 120, which is implemented as a Wheatstone bridge or a full bridge comprising GMR sensor elements 200-1, 200-2 forming along with a node 220-1, a first half bridge 210-1 and GMR sensor elements 200-3 and 200-4 forming along with the node 220-2 a second half bridge 210-2. The nodes 220 are coupled in between the series connection of the previously-mentioned sensor elements 200 of the respective half bridges 210. As outlined before in the context of FIG. 1, at the nodes 220 of the half bridges 210, a bridge sensor voltage is obtainable, which may, for instance, be indicative of a speed, a spatial variation of a magnetic field applied to the sensor elements 200 or the like. However, for the sake of simplicity only, in FIG. 6, the two nodes 220-1, 220-2 are not coupled to an evaluation of detection circuit like the detection circuit 170 also shown in FIG. 6.

Apart from the sensor arrangement 120, which is once again sensitive to the physical quantity, the circuit 110 and the sensor 100 comprise at least one further sensor element 130, which is also implemented in the embodiment shown in FIG. 6 as a GMR sensor element. As a consequence, also the further sensor element 130 is sensitive to the physical quantity or, to be more precise, to a magnetic field. Naturally, embodiments may once again comprise more than just one further sensor element 130 as shown in FIG. 6.

In terms of an orientation with respect to a direction 190 (not shown in FIG. 6), the further sensor element 130 may be arranged in between the so-called left sensor elements comprising the sensor elements 200-1 and 200-2 and the so-called right sensor elements 200-3, 200-2. In other words, each of the half bridges 210 comprises at least one left sensor element and at least one right sensor element, whereas the further sensor element 130 may, for instance, be arranged in between the previously-mentioned left and right sensor elements. However, the further sensor element 130 or the further sensor elements 130 may be arranged in different embodiments at different locations.

The circuit 110 further comprises a supply circuit 140, which is once again configured to provide the sensor arrangement 120 with a supply signal SS1 comprising a supply voltage controlled by the supply circuit 140 in a closed-loop configuration. Moreover, the supply circuit 140 is also configured to provide the at least one further sensor element 130 with a further supply signal SS2 comprising a further supply current such that the magnitude of the further supply current fulfills a predetermined relationship with the magnitude of the supply current of the supply signal SS1. To be a little more specific, the further supply current of the further supply signal SS2 is essentially proportional to the magnitude of the supply current of the supply signal SS1. To enable this, the supply circuit 140 comprises a current mirror 600, which is configured to provide the further supply signal SS2 with the magnitude of the further current based on the magnitude of the supply current of the supply signal SS1.

To facilitate this, the current mirror 600 comprises a first transistor 610 which is implemented in the embodiment shown in FIG. 6 as a p-channel MOSFET (Metal Oxide Semiconductor Field-Effect Transistor), second transistor 620 and a third transistor 630 which are also implemented as p-channel MOSFETs. Each of the three transistors 610, 620, 630 comprises a source terminal which is coupled to a terminal 640 for an external supply voltage VDD. Moreover, each of the transistors 610, 620, 630 comprises a gate terminal, which are interconnected to one another. A drain terminal of the first transistor 610 is also coupled to the gate terminals of the first, second and third transistors 610, 620, 630. As a consequence, the first transistor 610 forms an input of the current mirror 600.

The drain contacts or terminals of the second transistor 620 forms an output of the supply circuit 140 at which the supply signal SS1 is generated and provided to the sensor arrangement 120. In other words, the two half bridges 210-1, 210-2 of the sensor arrangement 120 are coupled in parallel to the drain terminal of the second transistor 620.

At a drain terminal of the third transistor 630, the further supply signal SS2 is provided and fed into the further sensor element 130 via the second node 180 as described in the context of FIG. 1. Both the sensor elements 200 of the sensor arrangement 120 as well as the further sensor element 130 are coupled to a terminal 240 for a reference potential such as ground.

When a current is provided into the input branch of the current mirror 600 or, in other words, fed through the first transistor 610, the current mirror 600 replicates a proportional current in both the second and third transistors 620, 630. The proportionality is essentially determined by the layout of the second transistor 620 with respect to the first transistor 610 and of the third transistor 630 with respect to the first transistor 610. For instance, in the case of a MOSFET-implementation, channel width of the respective transistor 610, 620, 630 and ratios based thereon may determine or at least partially influence the proportionality factors of the current mirror 600.

The supply circuit 140 is based on generating a control current CC flowing through the first transistor 610 and a fourth transistor 650, coupled in between the first transistor 610 and a further terminal 240 for the reference potential. To be more precise, a source contact of the fourth transistor 650 is coupled to the terminal 240 for the reference potential, for instance the ground potential, while a drain contact or terminal of the fourth transistor 650 is coupled to the drain terminal of the first transistor 610. A gate terminal of the fourth transistor 650 is coupled to an output of an operational amplifier 660. A non-inverting input of the operational amplifier 660 is provided with a reference voltage indicative of the supply voltage of the supply signal SS1, which is also referred to as bridge voltage Vbr. An inverting input of the operational amplifier is coupled to a first node 150 coupled in between the output of the supply circuit 140 and the sensor arrangement 120 as outlined before.

Hence, the electrical connection between the first node 150 and the inverting input of the operational amplifier 660 forms the feedback circuit 660, which is used to create the regulated or controlled voltage Vbr provided to the sensor arrangement 120. Due to the feedback circuit 660, the supply circuit 140 operates in the closed-loop configuration as described above.

To put it in different terms, the supply circuit 140 comprises a voltage regulator 670, which comprises the first and fourth transistor 610, 650, the operational amplifier 660 and at least partially the feedback circuit 160.

The control current CC as well as the currents flowing through the second and third transistors 620, 630 depend in terms of their magnitude on the physical quantity sensed by the sensor elements 200-1, . . . , 200-4. Therefore, information concerning an average value of the physical value is comprised in the in these currents.

Based on the control current CC flowing through the first transistor 610 and, hence, through the input path of the current mirror 600, the supply current of the supply signal SS1 comprises a magnitude which is based—via the previously-outlined proportionality factor of the transistors 620, 610 involved—based on the magnitude of the control current, while the supply voltage Vbr of the supply signal SS1 is controlled by the voltage regulator 670 comprising the feedback circuit 160.

Moreover, the further current of the further supply signal SS2 is also provided by the supply circuit 140 and its current mirror 600 in response to the control current CC based on the proportionality factor at least partially determined by the transistors 630, 610, involved. However, it is to be noted that the sensing voltage of the further supply signal SS2 is not controlled so that the at least one further sensor element 130 is operated in an open loop mode or configuration.

By employing an implementation based on a control current CC it may be more simple to implement the closed-loop configuration to control the supply voltage of the supply signal SS1. Additionally or alternatively, it may be possible to control the supply current and the further supply current more energy efficiently and/or more precisely than by directly influencing the supply current of the supply signal SS1.

The sensor 100 or—optionally—the circuit 110 further comprises in the embodiment shown in FIG. 6, the detection circuit 170, which is coupled to the second node 180 and the first node 150. To be a little more specific, the second node 180 is coupled to a non-inverting input of a differential amplifier 680 of the detection circuit 170 and the first node 150 is coupled to an inverting input of the differential amplifier 680. At an output of the differential amplifier 680, the differential amplifier 680 is capable of generating the output signal indicative of the information concerning the physical quantity.

The differential amplifier 680 of the detection circuit 170 is coupled to the supply circuit 140 to receive a first signal comprising the supply voltage of the supply signal SS1, for instance, from the first node 150. A second input of the differential amplifier 680 may be coupled to the at least one further sensor element 130 to receive a second signal. The second signal may comprise the sensing voltage of the further supply signal SS2, for instance, via the second node 180. The sensing voltage may correspond to or be indicative of a voltage drop across the at least one further sensor element 130. The differential amplifier may then be configured to provide the output signal based on a difference of a supply voltage and the sensing voltage at an output of the differential amplifier 680.

The detection circuit 170 and its differential amplifier 680 along with the at least one further sensor element 130 may, in the embodiment shown in FIG. 6, form a so-called central path 690 similar to those of the solutions shown in FIGS. 4 and 5.

A basic idea behind the embodiment shown in FIG. 6 is to supply the central GMR cell or sensor element 130 with a current which is a replica of the current flowing through the GMR Wheatstone bridge (sensor arrangement 120) with its right and left probes or sensor elements 200. The replica may be a scaled replica according to the previously-mentioned ratio.

In this case, a magnetic field-dependent current is flowing through the further sensor element 130. The current may be dependent on the physical quantity sensed by the sensor elements 200-1, . . . , 200-4 such that information on an average value of the physical quantity may be comprised in this current. A reference voltage for the central path 690 is the supply voltage of the supply signal SS1 of the GMR Wheatstone bridge (sensor arrangement 120).

To illustrate this in more detail, in the following equations valid in a linear region of sensitivity of GMR sensor elements 200, 130 will be derived. The magnetic fields to be sensed, with their homogeneous component, are assumed to be given by:

$$B_R = B_{hom}(t) + B_0 \sin(\omega t)$$

$$B_C = B_{hom}(t) + B_0 \sin(\omega t + \varphi)$$

$$B_L = B_{hom}(t) + B_0 \sin(\omega t + 2\varphi)$$

The current flowing in the sensor arrangement 120 (Wheatstone bridge) turns out to be:

$$I_{br} = \frac{V_{br}}{R_{GMR}(1 + \alpha \Delta T + \dots)(1 + S*B_R) +} = \frac{R_{GMR}(1 + \alpha \Delta T + \dots)(1 + S*B_L)}{2}$$

$$= \frac{V_{br}}{R_{GMR}(1 + \alpha \Delta T + \dots)\left(1 + S*\left(\frac{B_R + B_L}{2}\right)\right)},$$

wherein $R_{GMR}(1+\alpha\Delta T+ \dots)$ represents the GMR resistance with its temperature coefficients. S is the GMR sensitivity in the linear region. Using a replica current flowing in the central GMR (further sensor element 130), the sensing voltage at the second node 180 is $$V_{cent} = \frac{V_{br}}{R_{GMR}(1 + \alpha \Delta T + \dots)\left(1 + S*\left(\frac{B_R + B_L}{2}\right)\right)} *$$

$$R_{GMR}(1 + \alpha \Delta T + \dots)(1 + S*B_C).$$

As a first result, it is to be noted that the resistance of GMR (with its temperature coefficients) is cancelled out. Moreover, under the assumption that the sensitivity is much lower than 1, the equation above can be rewrite approximating it with the Taylor's series, truncated at the first order:

$$V_{cent} \approx V_{br}\left(1 - S*\frac{B_R + B_L}{2}\right)*(1 + S*B_C) =$$

$$V_{br}\left(1 + S*\left(B_C - \frac{B_R + B_L}{2}\right) - S^2*\left(B_C*\frac{B_R + B_L}{2}\right)\right)$$

By neglecting the quadratic contribute ($S^2$ infinitesimal of second order) and subtracting the constant voltage $V_{br}$, which is magnetic field independent, the differential voltage at the central path 690 can be written as:

$$V_{cent,diff} \approx V_{br}*S*\left(B_C - \frac{B_R + B_L}{2}\right)$$

Substituting the magnetic fields leads to:

$$V_{cent,diff} \approx V_{br}*S*\Big((B_{hom}(t) + B_0\sin(\omega t + \varphi)) - \frac{(B_{hom}(t) + B_0\sin(\omega t)) + (B_{hom}(t) + B_0\sin(\omega t + 2\varphi))}{2}\Big)$$

It can easily be noticed that the homogeneous field $B_{hom}(t)$ cancels out. By expanding the half sum term, using the trigonometric formulas, it yields:

$$V_{cent,diff} \approx V_{br} * S * (B_0 \sin(\omega t + \varphi)) - B_0 * \cos\varphi * \sin(\omega t + \varphi)) == \quad (1.1)$$
$$V_{br} * S * (B_0(1 - \cos\varphi) * \sin(\omega t + \varphi))$$

Considering the output differential signal of the right-left GMR Wheatstone bridge (sensor arrangement 120), it follows:

$$V_{br,sense} = V_{br} * S * \frac{(B_R - B_L)}{2} = V_{br} * S * (B_0 \sin\varphi * \cos(\omega t + \varphi)) \quad (1.2)$$

Figure 7:
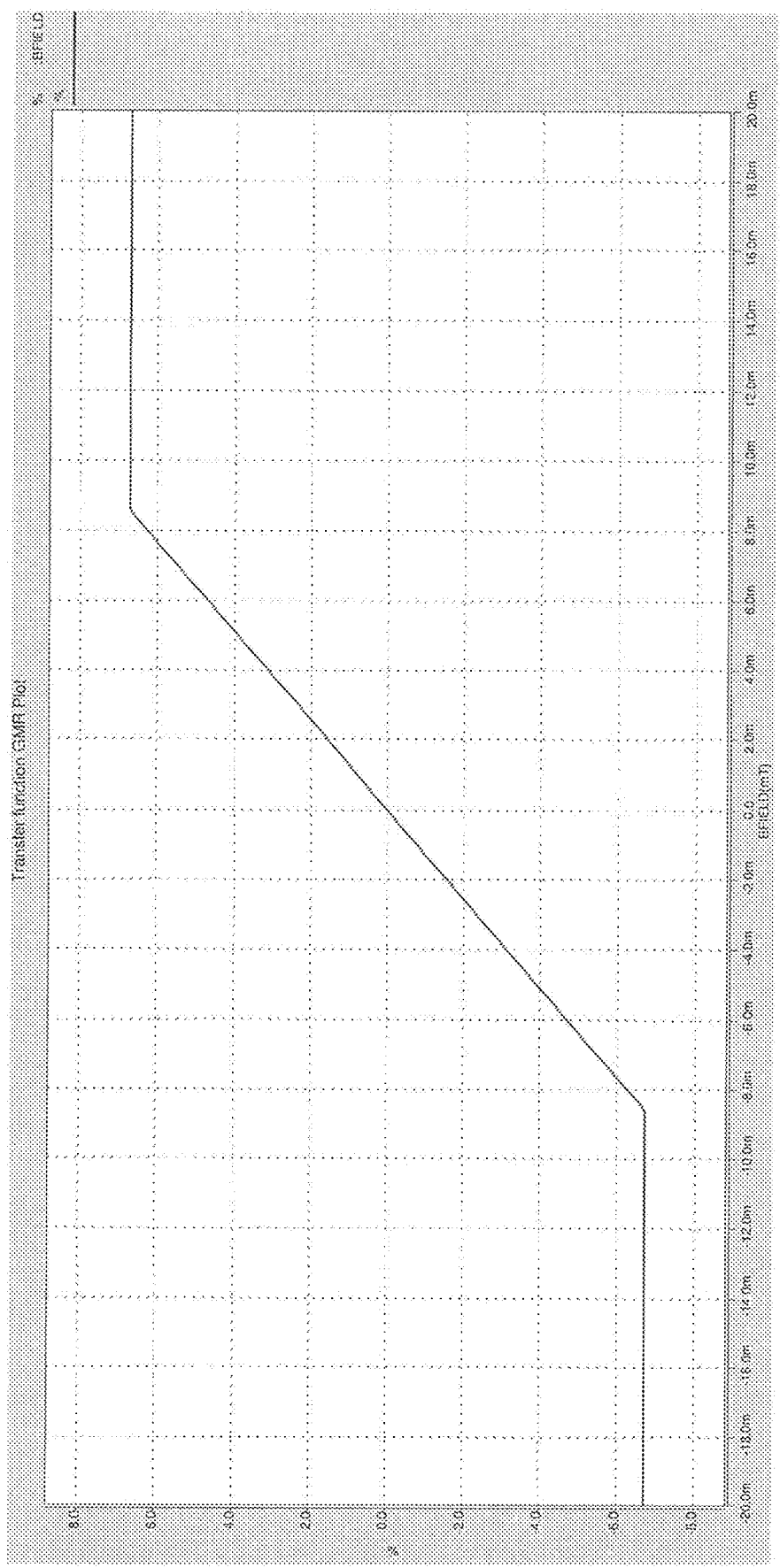
FIG. 7 shows a GMR transfer function.

By analyzing equation (1.1) and (1.2), it can be concluded:
- $V_{cent,diff}$-signal is always in phase with the magnetic field $B_C$, sensed by the central GMR (further sensor element 130)
- $V_{cent,diff}$ is always in quadrature with the Wheatstone bridge output $V_{br,sense}$
- at $\varphi=\pi/2$ the amplitude of $V_{cent,diff}$ equals the amplitude of $V_{br,sense}$. For $\varphi<\pi/2$ the central signal $V_{cent,diff}$ becomes smaller than $V_{br,sense}$, while for $\varphi>\pi/2$ occurs the opposite, because $1-\cos\varphi>\sin\varphi$ FIG. 7 shows a transfer function of a GMR sensor element, which may be used as a sensor element 200 of the sensor arrangement 120 or as one of the at least one further sensor elements 130. In a window of approximately −8.5 mT to +8.5 mT, the GMR sensor element shows an essentially linear behavior. Outside this window, a saturation behavior is observed.

In the next figures simulation results will be shown, obtained from the implementation of the block level circuit shown in FIG. 6.

At first, the GMR cells or sensor elements 200, 130 (right-center-left) are stimulated with small sinusoidal magnetic signals, in order to illustrate an operation in the linear region of sensitivity described before. The transfer function of a GMR sensor element, expressed in percentage resistive variation over magnetic field change, is modeled as depicted in FIG. 7.

The sensitivity in the linear range is assumed to be S=0,76%/mT. According to equation (1.1), the central signal and the sensitivity in the central path scale with dependence on the phase shift between right/center (or center/left). The scaling factor is:

$$S*(1-\cos\varphi) \quad (1.3)$$

In the following figures $\varphi=120°$, $\varphi=90°$, $\varphi=60°$ and $\varphi=45°$ are used for the phase shift.

Figure 8:
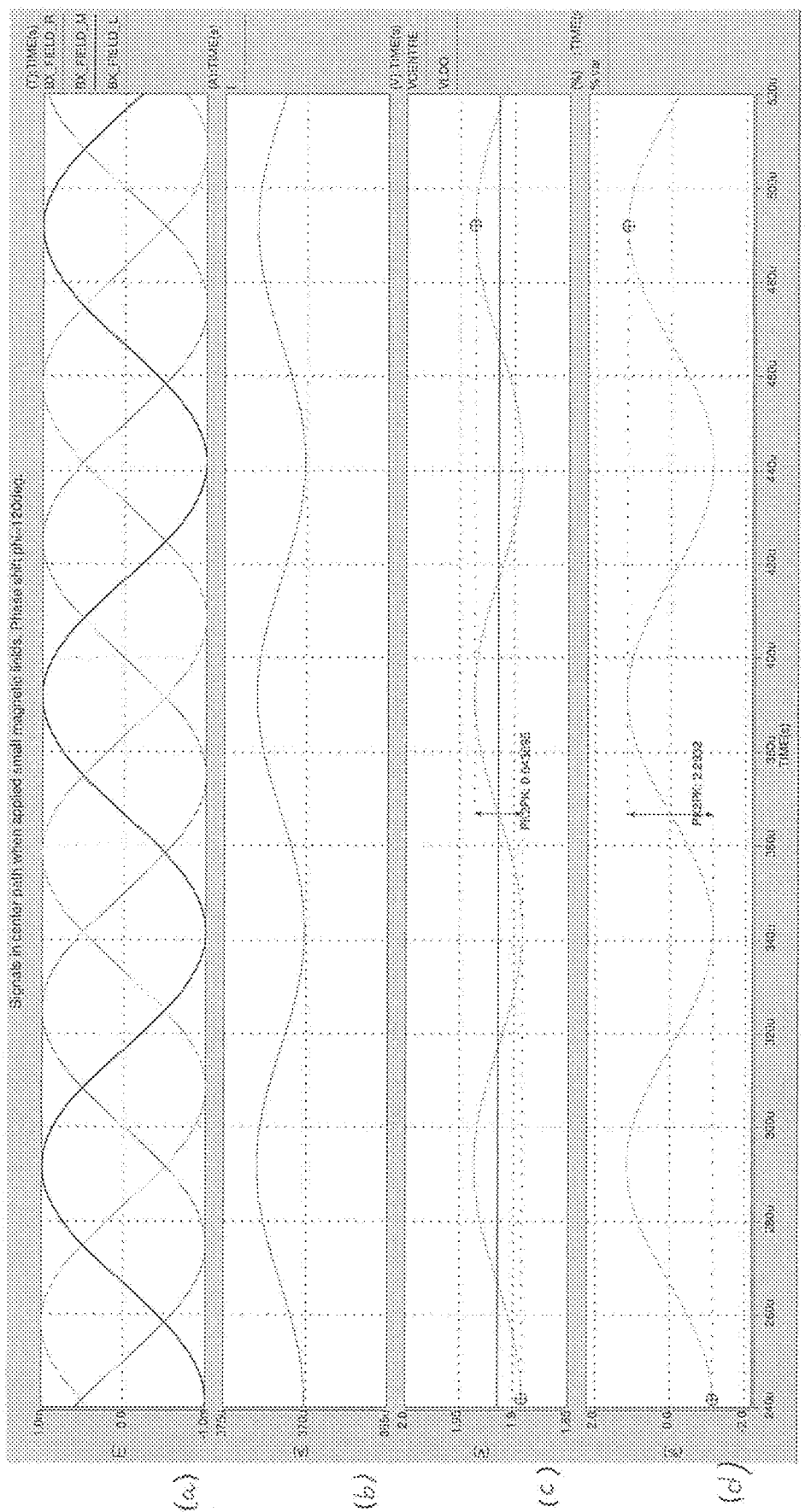
FIGS. 8A to 8D show diagrams of small magnetic signals of a sensor according to an embodiment with a phase shift of 120°.
Figure 9:
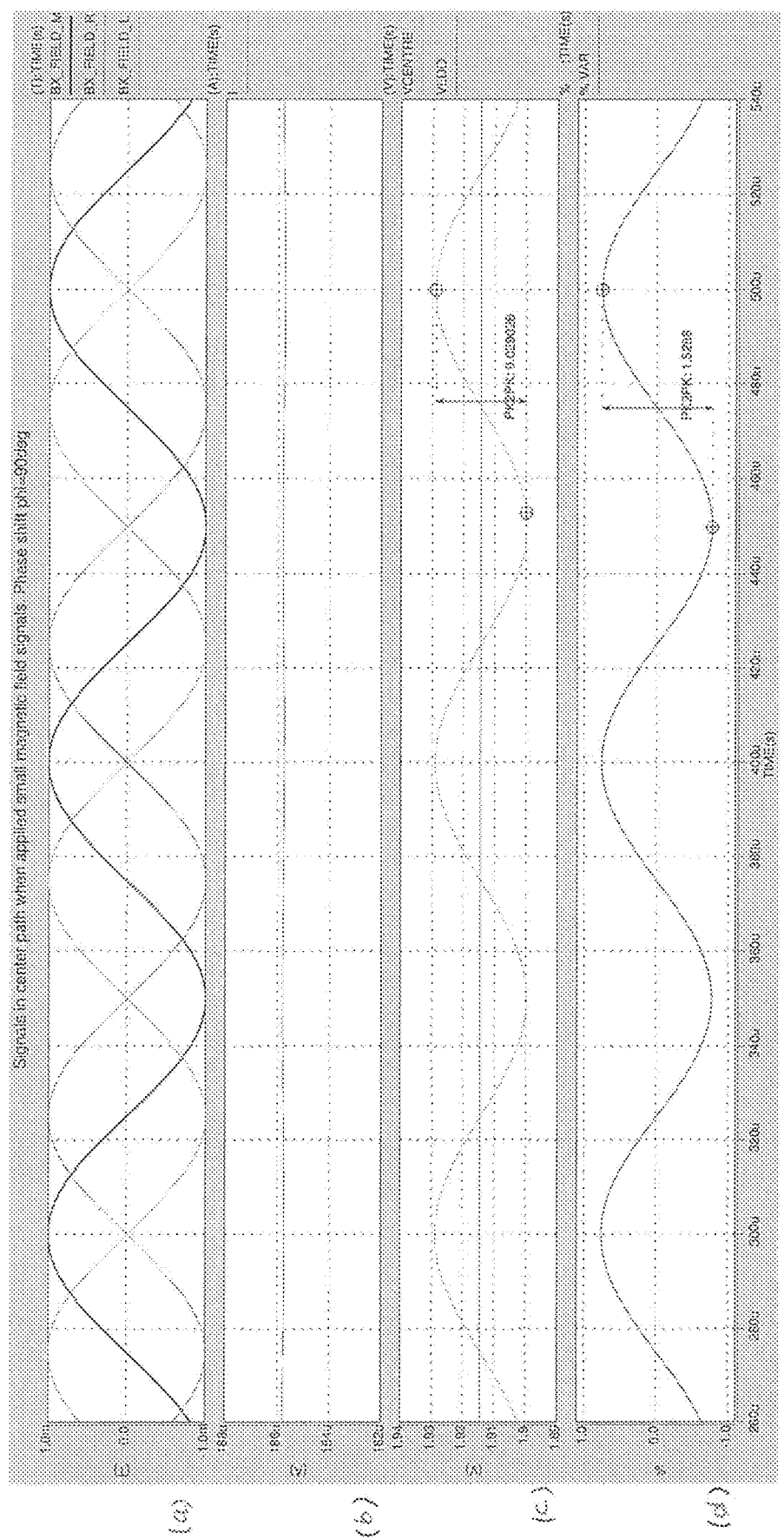
FIGS. 9A to 9D show diagrams of small magnetic signals of a sensor according to an embodiment with a phase shift of 90°.
Figures 10A, 10B, 10C, 10D:
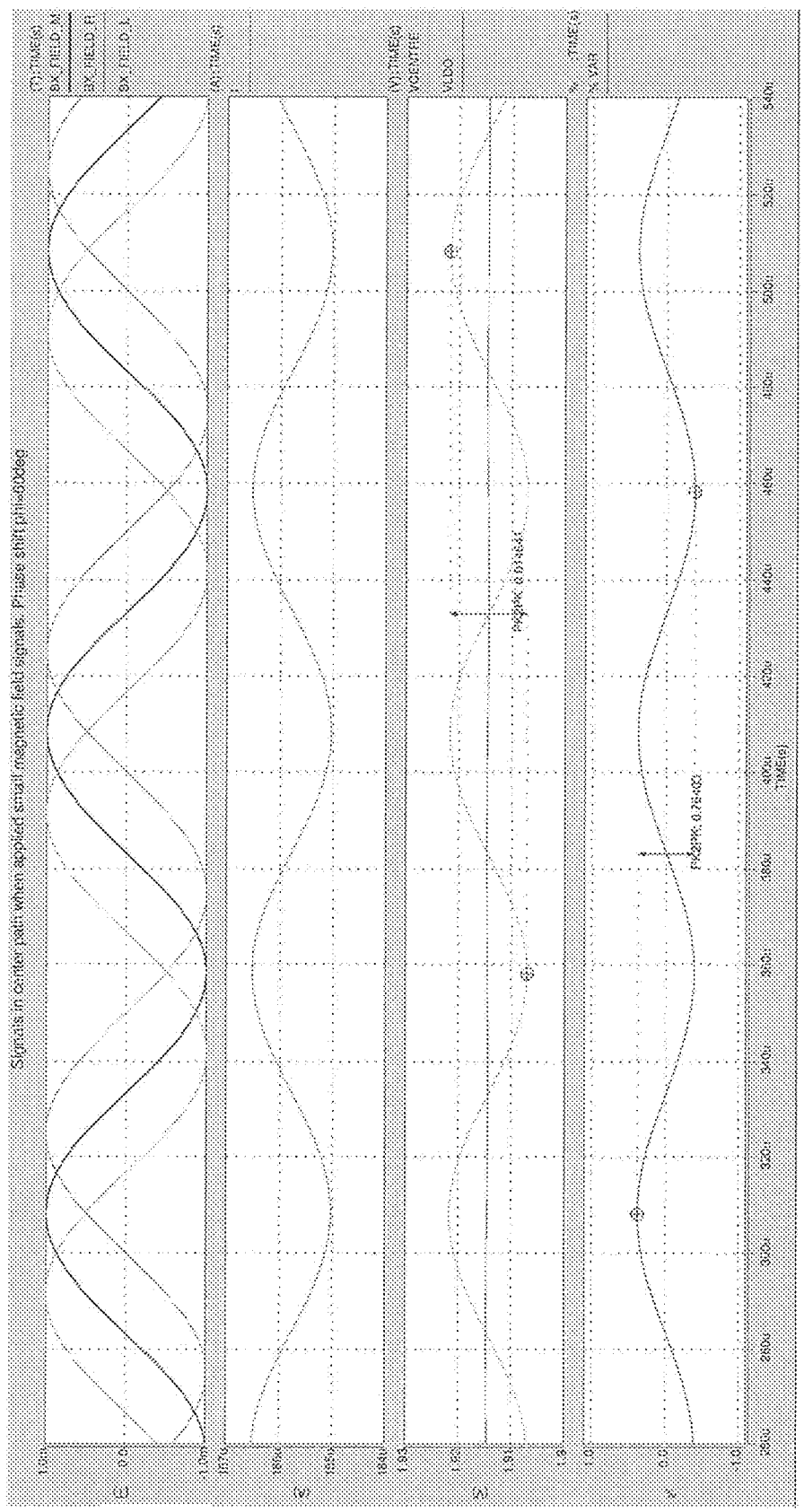
FIGS. 10A to 10D show diagrams of small magnetic signals of a sensor according to an embodiment with a phase shift of 60°.
Figures 11A, 11B, 11C, 11D:
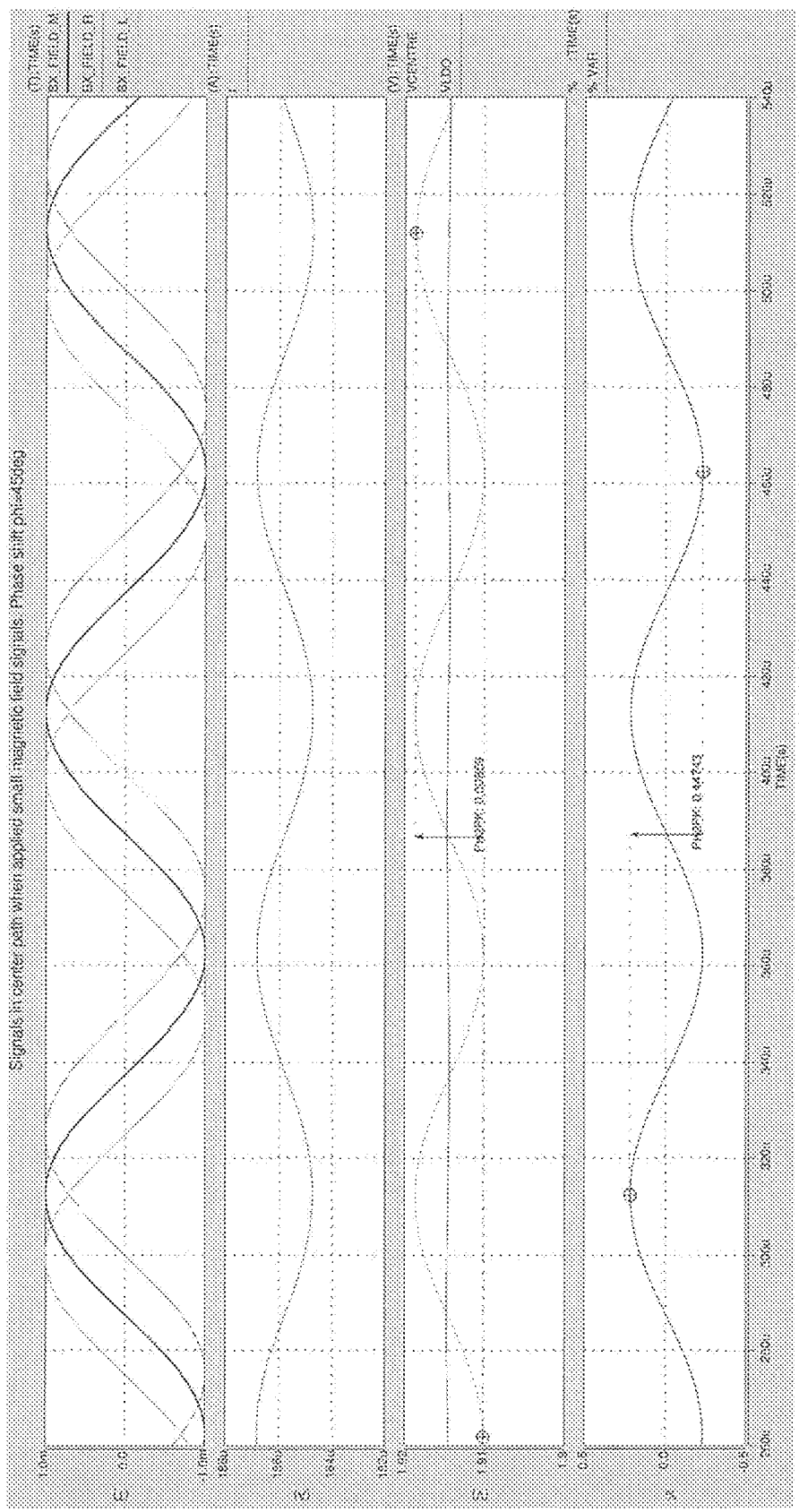
FIGS. 11A to 11D show diagrams of small magnetic signals of a sensor according to an embodiment with a phase shift of 45° without a homogeneous external magnetic field.

FIG. 8a to FIG. 8d show different diagrams of signals in the case of applying small magnetic signals to the sensor 100 shown in FIG. 6. A phase shift of $\varphi=120°$ is used in context with the center path 690. To be more precise, FIG. 8a shows the sensed magnetic signals. FIG. 8b shows the replica current in the center GMR sensor device (further sensor device 130). FIG. 8c shows the voltage across the center GMR sensor element and the reference voltage used in the center path 690. FIG. 8d shows the percentage variation of the Vcent at the second node 180 in relation to its average according to equation (1.3). FIG. 9a to FIG. 9d show the same small magnetic signals for a phase shift of $\varphi=90°$, while FIG. 10a to FIG. 10d show the same small magnetic signals for a phase shift of $\varphi=60°$. Moreover, FIG. 11 shows the same diagrams for signals with a phase shift of $\varphi=45°$.

It is to be noted that in these figures the central position is also referred to as the middle position abbreviated by the letter "M".

In the following figures, saturation effects of the GMR sensor elements are introduced based on the GMR transfer characteristic of FIG. 7. The sensors elements are stimulated with large sinusoidal signals. The consequence of saturation in GMR resistances reflects into the current flowing in the central GMR (further sensor elements 130). In case of phase shift $\varphi=90°$, the replica current is still constant, although a small ripple is visible in the simulation, which is due to capacitive couplings, because the saturation effects are symmetrical. The center signal is still in phase with the magnetic signal at the middle or central GMR sensor element (further sensor element 130). However, the signal sequence is rectangular and not sinusoidal anymore.

Figures 12A, 12B, 12C:
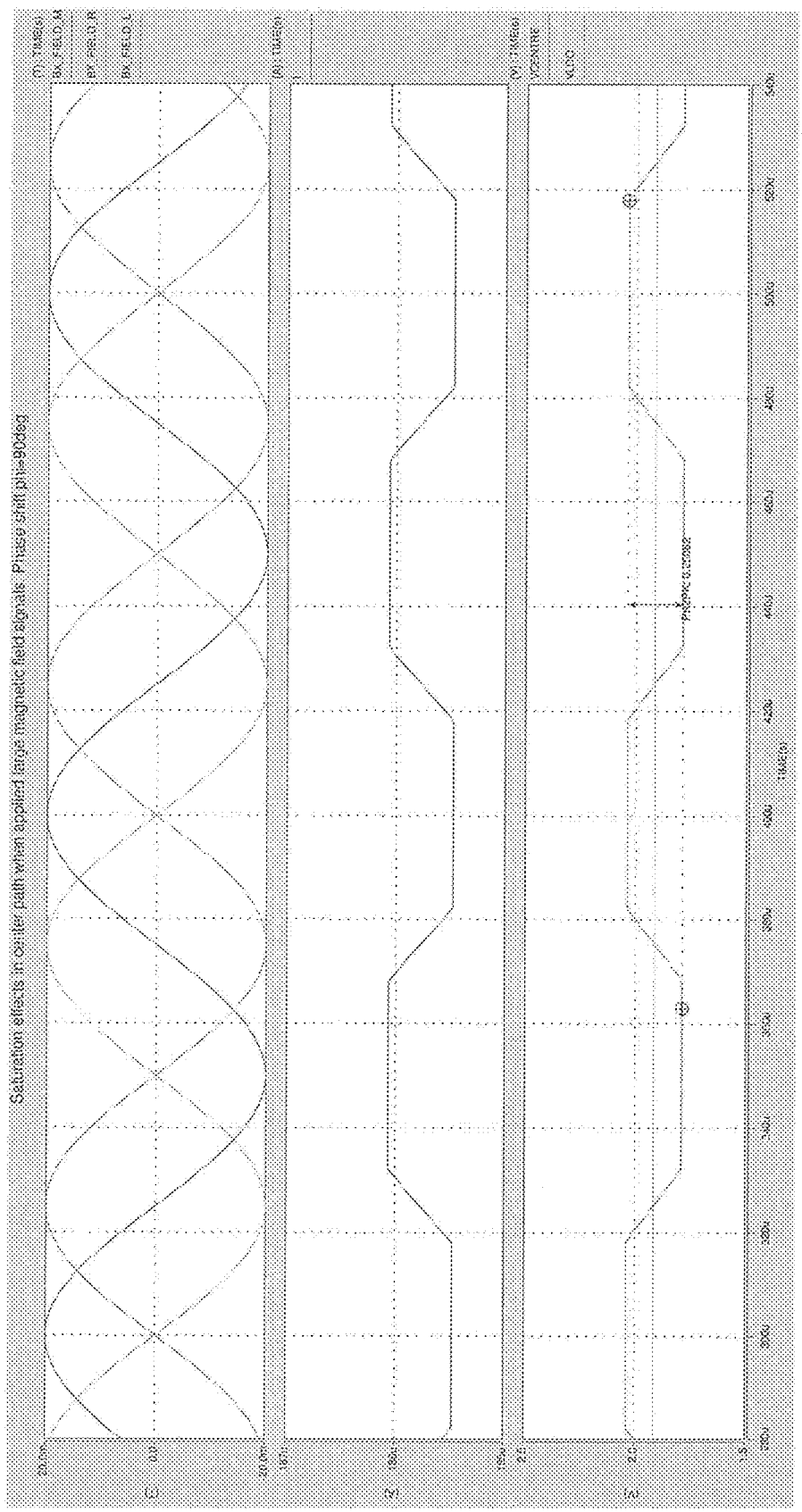
FIGS. 12A to 12C show diagrams of large magnetic signals in a sensor according to an embodiment with a phase shift of 90°.

FIG. 12a to FIG. 12c show diagrams of large magnetic signals in the center path 690 with $\varphi=90°$. FIG. 12a shows the sensed magnetic signals, FIG. 12b the replica current in the center GMR sensor element (further sensor element 130) and the voltage across the center GMR. FIG. 12c shows the reference voltage used in central path.

In the following, a short comparison between a more conventional approach and the new topology of central path 690 will be given. Since the new concept employing an embodiment may be implemented using a sensor arrangement 120 differentially measuring (i.e. external homogenous magnetic fields may be suppressed), a comparison with another differential solution will be provided, consisting of a second Wheatstone bridge 410' in addition to a right-left Wheatstone bridge 410, as, for instance, shown in FIG. 5. The comparison is based on an implementation with two right and two center GMR sensor elements.

The analysis is done for small magnetic signals and large ones, at $\varphi=90°$ and $\varphi=60°$. For completeness, the resulting differential signal of right-left Wheatstone bridge 410 are also provided. As stated in equations (1.1) and (1.2), in the new topology the quadrature between the central path signal and he differential right/left path may be provided independently of the phase shift, so far that an operation in the linear range of GMR sensitivity may be used. This is, in contrast, typically not the case for the right-center Wheatstone bridge solution.

Figures 13A, 13B, 13C:
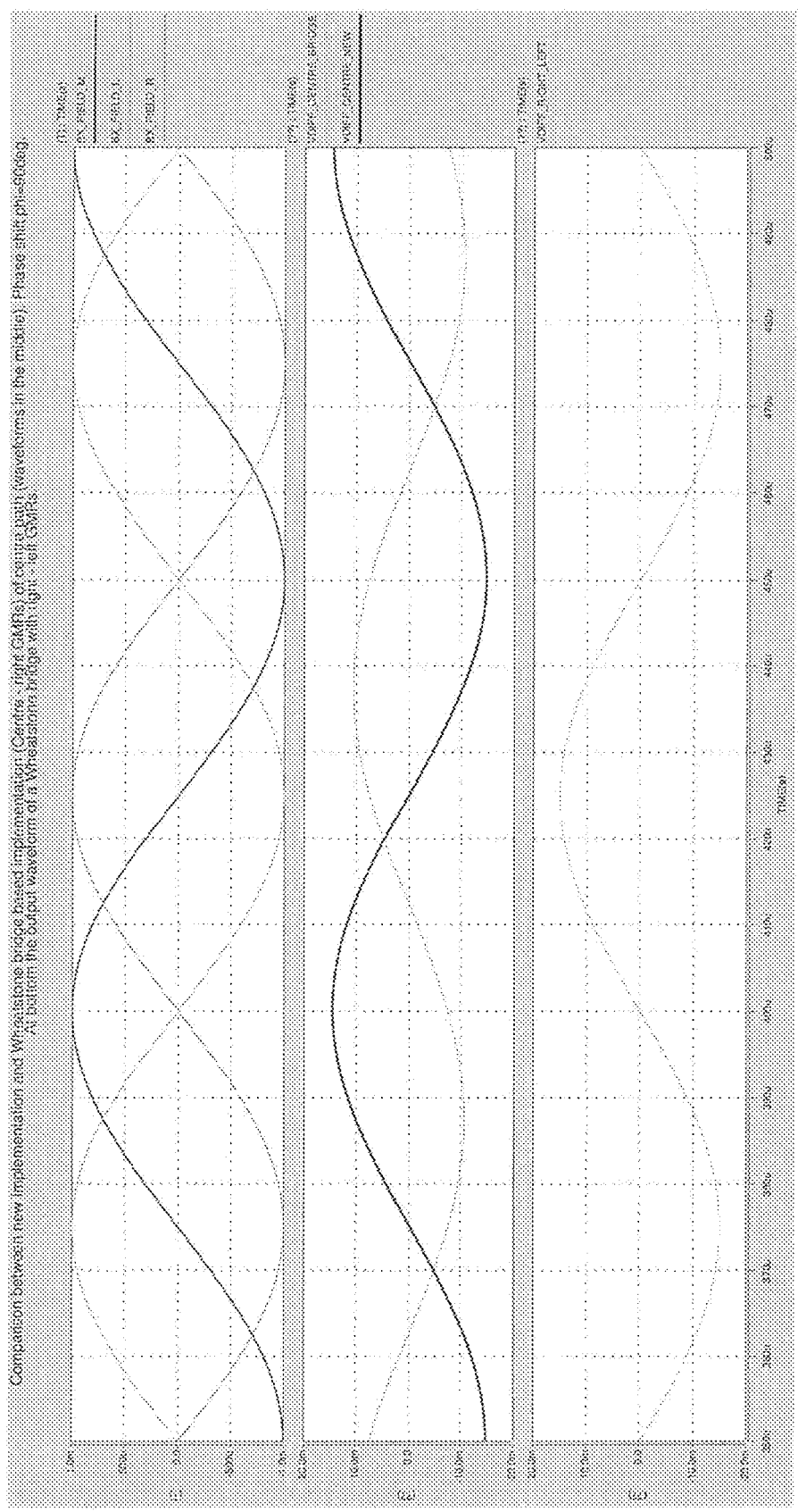
FIGS. 13A to 13C show diagrams illustrating a comparison between a conventional sensor and a sensor according to an embodiment for small magnetic signals with a phase shift of 90°.
Figures 14A, 14B, 14C:
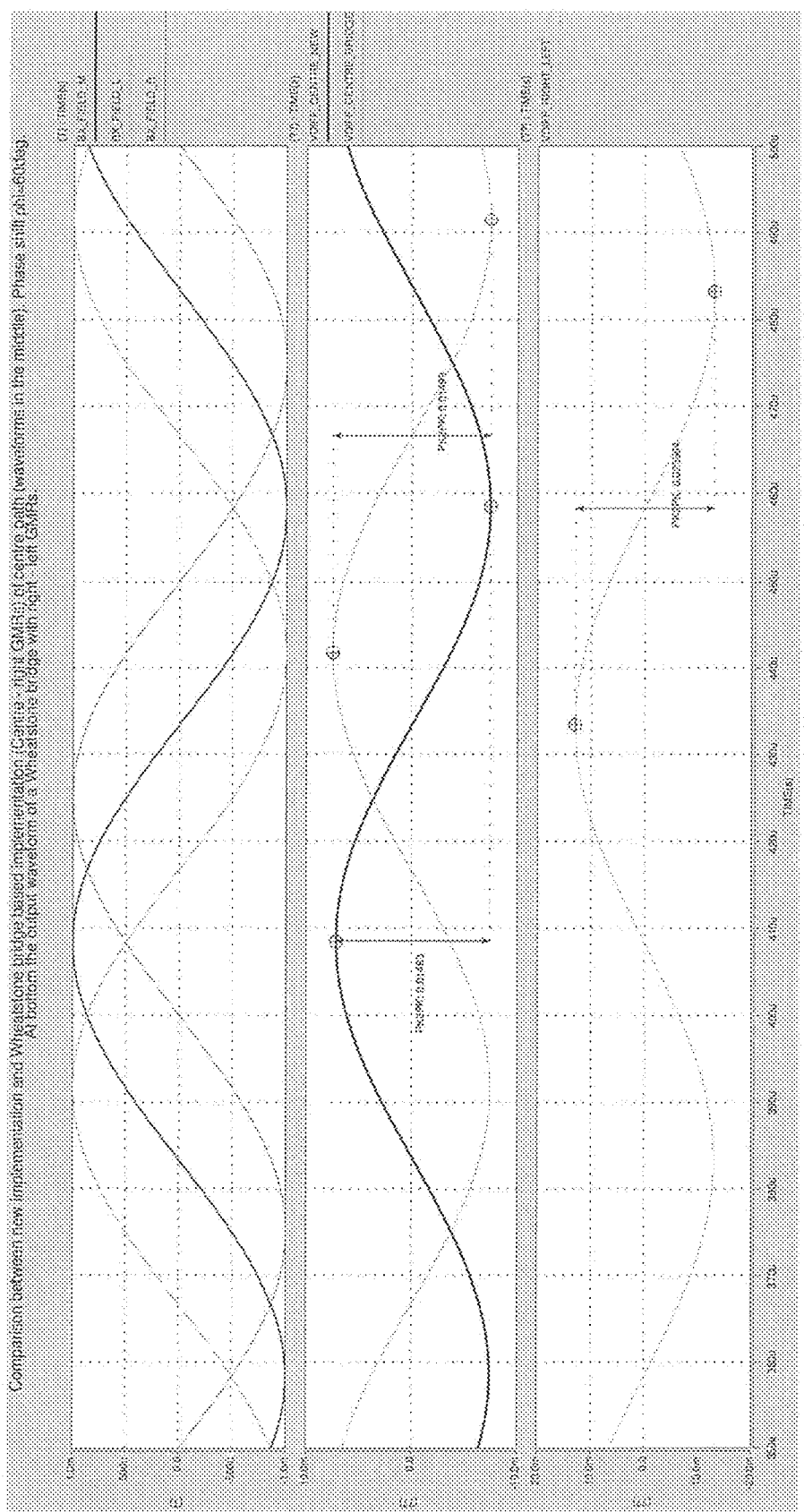
FIGS. 14A to 14C shows a diagram illustrating a comparison between a more conventional sensor and a sensor according to an embodiment for small magnetic signals with a phase shift of 60°.

To be more specific, FIGS. 13 and 14 show comparisons of the previously mentioned more conventional implementation and of an implementation according to an embodiment for small magnetic signals with a phase shift of $\varphi=90°$ and $\varphi=60°$, respectively. FIGS. 13a and 14a show the sensed magnetic signals, whereas FIG. 13b and FIG. 14b show differential voltages of the center path in the implementation according to an embodiment (thick line) and in the right-centre Wheatstone bridge 410'. FIGS. 13c and 14c show the differential voltage of the right-left Wheatstone bridge 120, 410 in FIGS. 6 and 5, respectively.

Figures 15A, 15B, 15C:
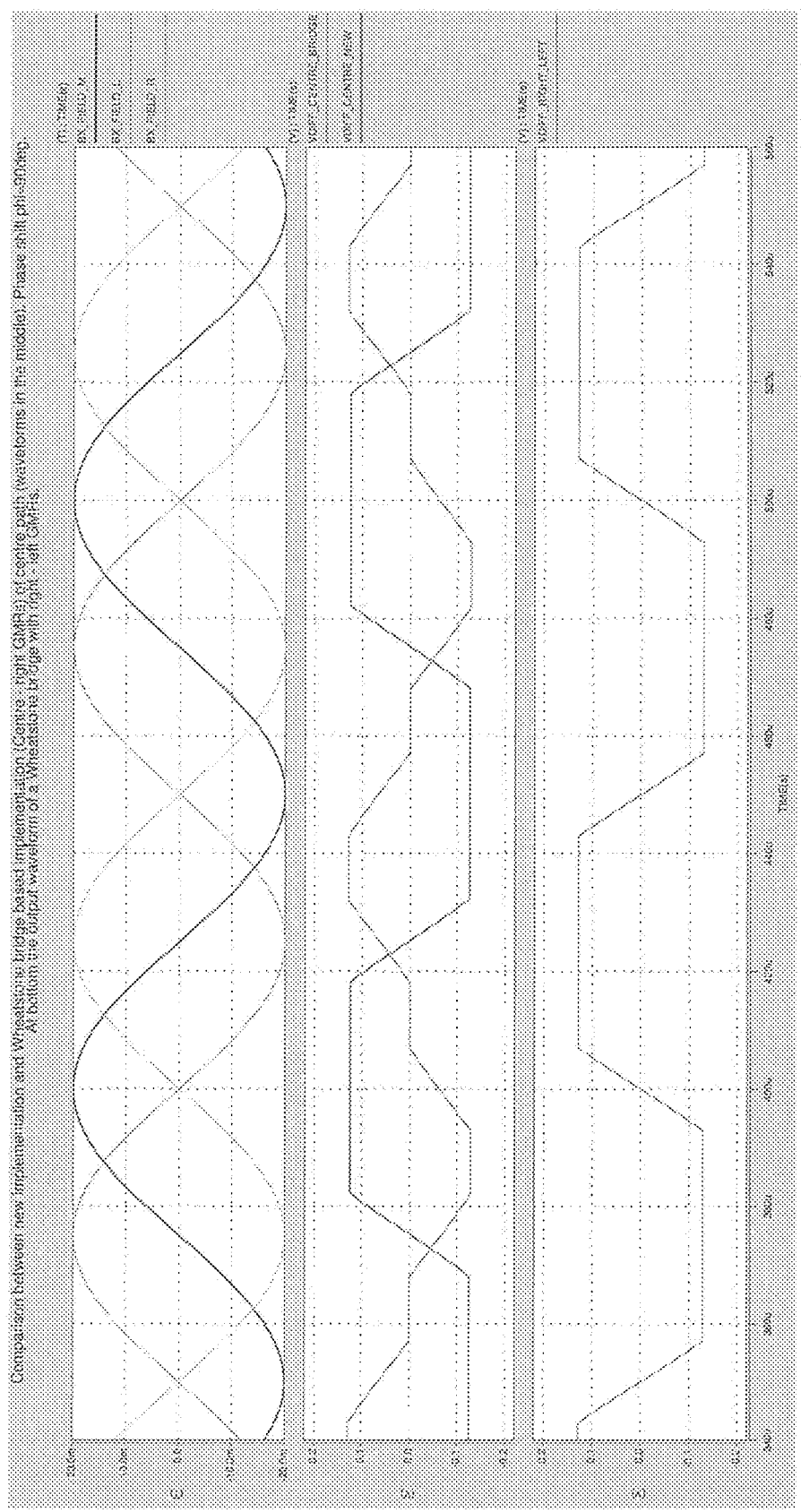
FIG. 15A to FIG. 15C show diagrams illustrating a comparison between a more conventional sensor and a sensor according to an embodiment for large magnetic signals with a phase shift of 90°.

At large magnetic signals, in case of a phase shift of $\varphi=90°$, the central path and the differential path are still in quadrature using the embodiment depicted in FIG. 6, because the saturation effects occur symmetrical at the right and left GMR sensor elements. To illustrate this in more detail, FIG. 15a to FIG. 15c show diagrams illustrating a comparison between a more conventional implementation and an implementation according to an embodiment for large magnetic signals with a phase shift of $\varphi=90°$. FIG. 15a shows the sensed magnetic signals, whereas FIG. 15b shows the differential voltage of the center path 690 using an implementation according to an embodiment (thick) and of a right-center Wheatstone bridge 410' as depicted in FIG. 5.

Finally, FIG. 15c shows the differential voltage of the right-left Wheatstone bridges 120, 410 of FIGS. 6 and 5, respectively.

FIG. 16a to FIG. 16d show the results of a simulation, which is based on the GMR sensor elements or probes being stimulated with sinusoidal magnetic fields, with an additional homogeneous DC- or offset-component. As expected, in the electrical signal Vcent the offset-component is suppressed.

FIG. 16a to FIG. 16d show diagrams in response to small magnetic signals for a phase shift of φ=90°. FIG. 16a shows the sensed magnetic signals, while FIG. 16b shows the replica current in the center GMR sensor element. FIG. 16c shows the voltage across the center GMR sensor element and the reference voltage used in center path 690. Finally, FIG. 16d shows the sensitivity of the center sensor element 130.

Embodiments may allow, for instance, a magnetic speed sensor to offer a start-stop functionality, which may be referred to as a "0 Hz capability". In other words, a direction detection at very low speeds during the start-stop procedure may also be possible using an embodiment. Embodiments may, for instance, be used in wheel speed detection applications, to name just one.

As outlined before, conventional, concentrated sensor elements (mono cells) might be used. However, mono cells may not be able to suppress homogeneous changes in the physical quantity as opposed to differential ones. For instance, a dynamic homogeneous magnetic disturbance-field may eventually not be distinguished from a differential field caused by a moving polewheel or another wanted magnetic field source. This may lead to a greatly degraded robustness of the sensor in the presence of external disturbances.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The methods described herein may be implemented as software, for instance, as a computer program. The subprocesses may be performed by such a program by, for instance, writing into a memory location. Similarly, reading or receiving data may be performed by reading from the same or another memory location. A memory location may be a register or another memory of an appropriate hardware. The functions of the various elements shown in the Figures, including any functional blocks labeled as "means", "means for forming", "means for determining" etc., may be provided through the use of dedicated hardware, such as "a former", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes, which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A circuit for obtaining information on a physical quantity, the circuit comprising:
   a sensor arrangement sensitive to the physical quantity;
   a single sensor element sensitive to the physical quantity; and
   a supply circuit configured to provide the sensor arrangement with a supply signal having a supply voltage controlled by the supply circuit in a closed-loop configuration,
   wherein the sensor arrangement is configured to provide a feedback signal to the supply circuit to regulate the supply signal based on operational conditions of the sensor arrangement, and
   wherein the supply circuit comprises a current mirror configured to provide the single sensor element with a further supply signal having a further supply current such that a magnitude of the further supply current is a replicated current and proportional to a magnitude of a supply current of the supply signal.

2. The circuit according to claim 1, wherein the supply circuit is configured such that according to the predefined relationship the magnitude of the further supply current is essentially proportional to the magnitude of the supply current.

3. The circuit according to claim 2, wherein the supply circuit is configured to control the magnitude of the control current such that the supply voltage of the supply signal is controlled in the closed-loop configuration.

4. The circuit according to claim 1, wherein the supply circuit is configured to keep the magnitude of the supply voltage of the supply signal essentially constant.

5. The circuit according to claim 1, further comprising a detection circuit coupled to the single sensor element and configured to generate an output signal indicative of the information on the physical quantity.

6. The circuit according to claim 5, wherein the detection circuit comprises a differential amplifier coupled to the single sensor element and configured to generate the output signal indicative of the information on the physical quantity.

7. The circuit according to claim 1, wherein the sensor arrangement comprises a plurality of sensor elements sensitive to the physical quantity, the sensor arrangement configured to generate a signal indicative of a spatial change of the physical quantity.

8. The circuit according to claim 7, wherein at least two sensor elements of the sensor arrangement are spatially shifted along a direction and coupled such that the sensor arrangement is configured to generate the signal indicative of the spatial change of the physical quantity along the direction.

9. The circuit according to claim 7, wherein at least two sensor elements of the sensor arrangement are coupled to each other to form at least one half bridge, the at least one half bridge comprising at least two sensor elements and a node coupled between the at least two sensor elements, wherein the signal indicative of the spatial change is obtainable at the node of the at least one half bridge.

10. The circuit according to claim 9, wherein the sensor arrangement comprises at least two half bridges coupled in parallel such that the signal indicative of the spatial change is obtainable at the nodes of the at least two half bridges.

11. The circuit according to claim 1, wherein the physical quantity comprises at least one of a strength of a magnetic field, a direction of the magnetic field, a strength of a component of a magnetic field, a temperature, a pressure, an intensity of an electromagnetic radiation, a frequency of the electromagnetic radiation, a wavelength of the electromagnetic radiation, and a mechanic al stress.

12. The circuit according to claim 1, wherein the sensor arrangement comprises at least one sensor element, and wherein the at least one sensor element of the sensor arrangement and the further sensor element comprise at least one of a magnetic field sensitive sensor element, a temperature sensor element, a pressure sensor element, a light detecting sensor element and a sensor element sensitive to mechanical exposure.

13. A method for obtaining information on a physical quantity, the method comprising:
providing a sensor arrangement with a supply signal comprising a supply voltage controlled by a supply circuit in a closed-loop configuration, the sensor arrangement being sensitive to the physical quantity;
providing, by the sensor arrangement, a feedback signal to the supply circuit to regulate the supply signal based on operational conditions of the sensor arrangement; and
providing, by a current mirror of the sensor circuit, a single sensor element with a further supply signal having a further supply current such that a magnitude of the further supply current is a replicated current and proportional to a magnitude of a supply current of the supply signal, wherein the single sensor element is sensitive to the physical quantity.

14. A sensor for obtaining information on a physical quantity, the sensor comprising:
a sensor arrangement sensitive to the physical quantity;
a single sensor element sensitive to the physical quantity;
a supply circuit configured to provide the sensor arrangement with a supply signal having a supply voltage controlled by the supply circuit in a closed-loop configuration,
wherein the sensor arrangement is configured to provide a feedback signal to the supply circuit to regulate the supply signal based on operational conditions of the sensor arrangement and
wherein the supply circuit comprises a current mirror configured to provide the single sensor element with a further supply signal having a further supply current such that a magnitude of the further supply current is a replicated current and proportional to a magnitude of a supply current of the supply signal; and
a detection circuit coupled to the single sensor element and configured to generate an output signal indicative of the information on the physical quantity.

* * * * *